US010703381B2

(12) United States Patent
Bender et al.

(10) Patent No.: US 10,703,381 B2
(45) Date of Patent: Jul. 7, 2020

(54) INTELLIGENT VEHICLE ACTION DECISIONS

(71) Applicant: International Business Machines Corporation, Armonk, NY (US)

(72) Inventors: Michael Bender, Rye Brook, NY (US); Gregory J. Boss, Saginaw, MI (US); Albert Avetisian, Armonk, NY (US); Jeremy R. Fox, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/203,274

(22) Filed: Nov. 28, 2018

(65) Prior Publication Data

US 2020/0164891 A1 May 28, 2020

(51) Int. Cl.
*B60W 50/00* (2006.01)
*G07C 5/08* (2006.01)
*G07C 5/02* (2006.01)
*B60W 50/08* (2020.01)

(52) U.S. Cl.
CPC .... *B60W 50/0098* (2013.01); *B60W 50/0097* (2013.01); *B60W 50/08* (2013.01); *G07C 5/02* (2013.01); *G07C 5/085* (2013.01); *B60W 2400/00* (2013.01); *B60W 2540/043* (2020.02);
(Continued)

(58) Field of Classification Search
CPC ............. B60W 50/0098; B60W 50/08; B60W 50/0097; B60W 2550/12; B60W 2900/00; B60W 2540/28; B60W 2400/00; G07C 5/02; G07C 5/085
See application file for complete search history.

(56) References Cited

U.S. PATENT DOCUMENTS 9,349,228 B2    5/2016  Ochsendorf et al.
10,049,408 B2 *  8/2018  Carver .................. G06Q 40/08
(Continued)

FOREIGN PATENT DOCUMENTS

WO    WO2014036355 A1    3/2014

OTHER PUBLICATIONS

P. Mell, et al. "*The NIST Definition of Cloud Computing*", NIST Special Publication 800-145, Sep. 2011, Gaithersburg, MD.

*Primary Examiner* — Tyler J Lee
(74) *Attorney, Agent, or Firm* — Brian Restauro, Esq.; George W. Blasiak, Esq.; Heslin Rothenberg Farley & Mesiti P.C.

(57) ABSTRACT

Methods, computer program products, and systems are presented. The method computer program products, and systems can include, for instance: obtaining sensor data from sensors disposed to output data indicative of vehicle driver performance of a first vehicle, the first vehicle having for a first trip an associated first driver user who drives the first vehicle during the first trip; processing the sensor data to return error event flags that indicate errors of the first driver user when driving the first vehicle during the first trip; recording for respective event flags of the error event flags values of a first driving environment classification parameter and values of a second driving environment classification parameter; and predicting a driving performance of the first driver user for a second trip, the second trip being a proposed trip to occur after the first trip.

20 Claims, 10 Drawing Sheets

(52) U.S. Cl.
CPC ..... *B60W 2555/20* (2020.02); *B60W 2900/00* (2013.01)

(56) References Cited

U.S. PATENT DOCUMENTS

| | | | | |
|---|---|---|---|---|
| 2006/0253307 | A1* | 11/2006 | Warren | G06Q 40/08 705/4 |
| 2008/0004807 | A1* | 1/2008 | Kimura | B60W 40/02 701/301 |
| 2008/0018493 | A1* | 1/2008 | Curtis | G08G 1/161 340/901 |
| 2010/0191411 | A1* | 7/2010 | Cook | G07C 5/085 701/31.4 |
| 2011/0077028 | A1* | 3/2011 | Wilkes, III | B60W 50/14 455/456.3 |
| 2015/0294422 | A1* | 10/2015 | Carver | G06Q 40/08 705/4 |
| 2017/0158205 | A1* | 6/2017 | Pink | B60W 30/08 |
| 2018/0194280 | A1* | 7/2018 | Shibata | A61B 5/18 |

\* cited by examiner

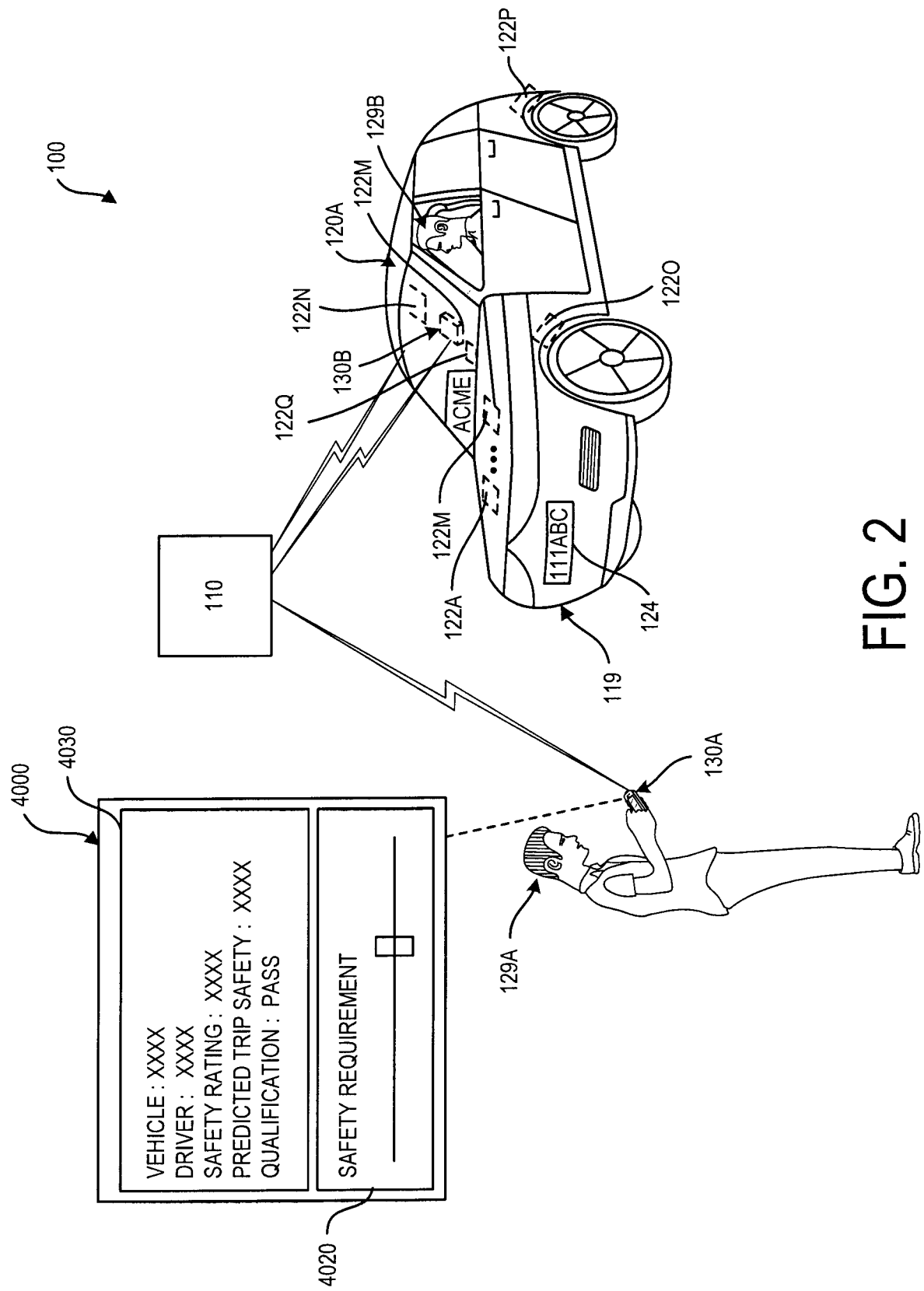

US 10,703,381 B2

INTELLIGENT VEHICLE ACTION DECISIONS

FIELD

The invention relates to artificial intelligence (AI) for return of action decisions in dependence on logged historical data indicative of vehicle driver performance.

BACKGROUND

Data structures have been employed for improving operation of computer system. A data structure refers to an organization of data in a computer environment for improved computer system operation. Data structure types include containers, lists, stacks, queues, tables and graphs. Data structures have been employed for improved computer system operation e.g. in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience.

SUMMARY

Shortcomings of the prior art are overcome, and additional advantages are provided, through the provision, in one aspect, of a method. The method can include, for example: obtaining sensor data from sensors disposed to output data indicative of vehicle driver performance of a first vehicle, the first vehicle having for a first trip an associated first driver user who drives the first vehicle during the first trip; processing the sensor data to return error event flags that indicate errors of the first driver user when driving the first vehicle during the first trip; recording for respective event flags of the error event flags values of a first driving environment classification parameter and values of a second driving environment classification parameter; predicting a driving performance of the first driver user for a second trip, the second trip being a proposed trip to occur after the first trip, the predicting being in dependence on the error event flags, the values of a first driving environment classification parameter and the values of a second driving environment classification parameter, wherein the error event flags, the values of a first driving environment classification parameter and the values of a second driving environment classification parameter define historical driving performance data of the first driver user; and returning an action decision in dependence on the predicting.

In another aspect, a computer program product can be provided. The computer program product can include a computer readable storage medium readable by one or more processing circuit and storing instructions for execution by one or more processor for performing a method. The method can include, for example: obtaining sensor data from sensors disposed to output data indicative of vehicle driver performance of a first vehicle, the first vehicle having for a first trip an associated first driver user who drives the first vehicle during the first trip; processing the sensor data to return error event flags that indicate errors of the first driver user when driving the first vehicle during the first trip; recording for respective event flags of the error event flags values of a first driving environment classification parameter and values of a second driving environment classification parameter; predicting a driving performance of the first driver user for a second trip, the second trip being a proposed trip to occur after the first trip, the predicting being in dependence on the error event flags, the values of a first driving environment classification parameter and the values of a second driving environment classification parameter, wherein the error event flags, the values of a first driving environment classification parameter and the values of a second driving environment classification parameter define historical driving performance data of the first driver user; and returning an action decision in dependence on the predicting.

In a further aspect, a system can be provided. The system can include, for example a memory. In addition, the system can include one or more processor in communication with the memory. Further, the system can include program instructions executable by the one or more processor via the memory to perform a method. The method can include, for example: obtaining sensor data from sensors disposed to output data indicative of vehicle driver performance of a first vehicle, the first vehicle having for a first trip an associated first driver user who drives the first vehicle during the first trip; processing the sensor data to return error event flags that indicate errors of the first driver user when driving the first vehicle during the first trip; recording for respective event flags of the error event flags values of a first driving environment classification parameter and values of a second driving environment classification parameter; predicting a driving performance of the first driver user for a second trip, the second trip being a proposed trip to occur after the first trip, the predicting being in dependence on the error event flags, the values of a first driving environment classification parameter and the values of a second driving environment classification parameter, wherein the error event flags, the values of a first driving environment classification parameter and the values of a second driving environment classification parameter define historical driving performance data of the first driver user; and returning an action decision in dependence on the predicting.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 2 is a physical schematic view of the system as shown in FIG. 1 according to one embodiment;

DETAILED DESCRIPTION

Figure 1:
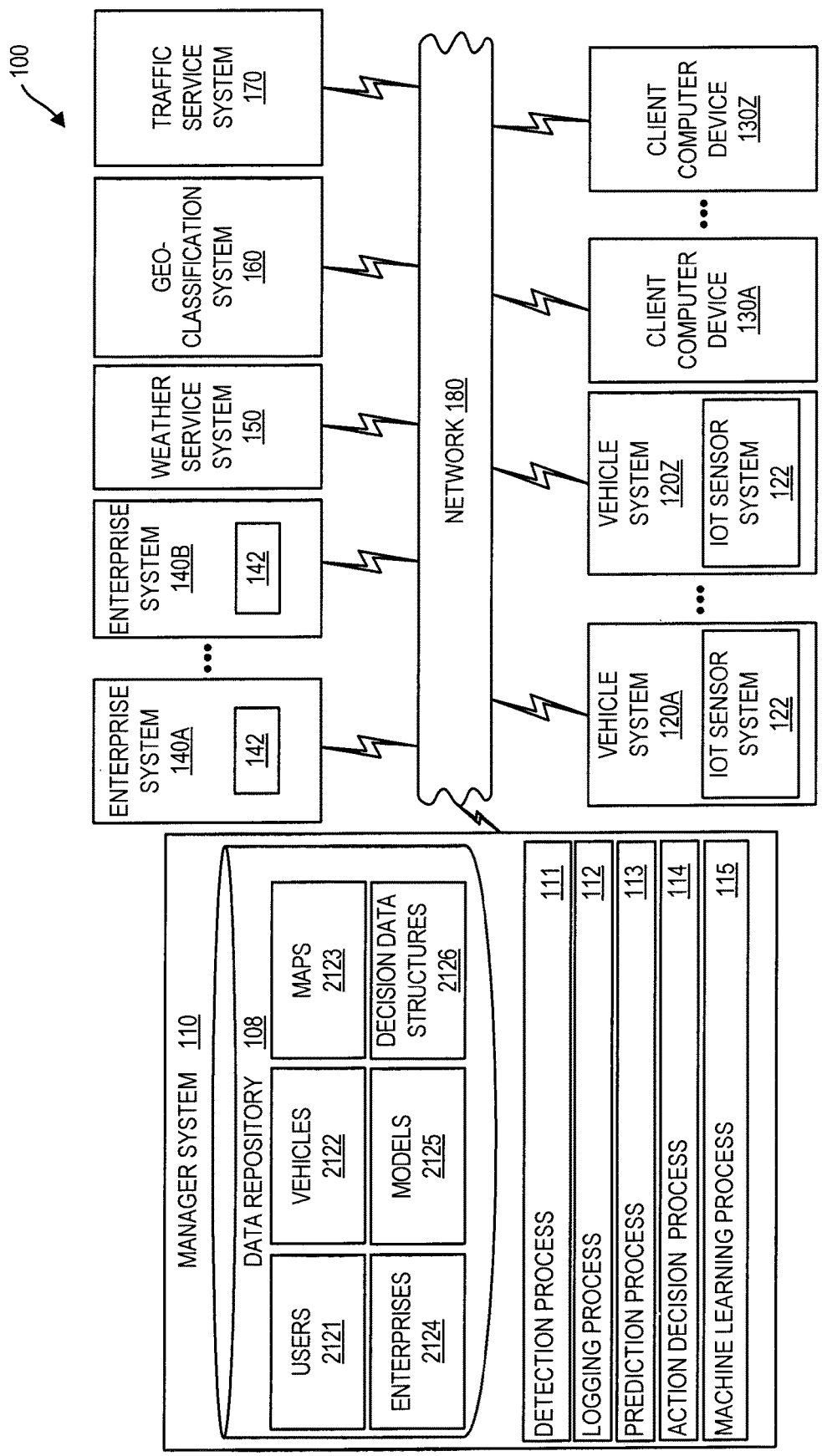
FIG. 1 is a block diagram of a system having a manager system, vehicle systems, client computer devices, enterprise systems, weather service system, a geo-classification system, and a traffic service system according to one embodiment.

System 100 for use in controlling motorized vehicles is shown in FIG. 1. System 100 can include manager system 110 having an associated data repository 108, vehicle systems 120A-120Z having associated Internet of Things (IoT) sensor systems 122, client computer devices 130A-130Z, enterprise systems 140A-140B having associated administrator client computer device 142, weather service system 150, geo-classification system 160, and a traffic service system 170. Manager system 110, vehicle systems 120A-120Z, client computer devices 130A-130Z, enterprise systems 140A-140B, weather service system 150, geo-classification system 160, and a traffic service system 170 can be in communication with one another via network 180. System 100 can include numerous devices which can be computing node based devices connected by network 180. The respective components depicted in FIG. 1 can be computing node based devices. Network 180 may be a physical network and/or a virtual network. A physical network can be, for example, a physical telecommunications network connecting numerous computing nodes or systems, such as computer servers and computer clients. A virtual network can, for example, combine numerous physical networks or parts thereof into a logical virtual network. In another example, numerous virtual networks can be defined over a single physical network.

According to one embodiment, manager system 110 can be external to vehicle systems 120A-120Z, client computer devices 130A-130Z, enterprise systems 140A-140B, weather service system 150, geo-classification system 160, and a traffic service system 170. According to one embodiment, manager system 110 can be collocated with one or more vehicle systems 120A-120Z, client computer devices 130A-130Z, enterprise systems 140A-140B, weather service system 150, a geo-classification system 160, and a traffic service system 170.

Vehicle systems 120A-120Z can include respective computing nodes for performance of various functions such as responding to control communications for controlling, e.g. vehicle performance features or driver or passenger environment features. Vehicle systems 120A-120Z can include respective IoT sensor systems 122.

An IoT sensor system 122 can include a plurality of IoT sensor devices distributed within a motor vehicle. IoT sensor devices can include, for example, IoT sensor devices for sensing engine performance and a variety of attributes related to driver performance including, acceleration actions of a user, steering actions of a user, and braking actions of a user. IoT sensor system 122 can include for example a plurality of IoT sensor devices distributed within an engine area of a car and about wheels of a car, e.g. for sensing braking actions, and also distributed within the steering wheel of a car for sensing steering control of a user. IOT sensor system 122 can include an IOT sensor for sensing location of the vehicle such as a vehicle GPS sensor. IOT sensor system 122 can include one or more weight IOT sensor for sensing users seated within a vehicle. IoT sensor system 122 can include a camera based IoT sensor system, e.g. for sensing image data representing users such as driver users and passenger users and system 100 can be configured to process image representations of such users for performance of facial recognition, for example. IOT sensor system 122 on sending IOT sensor data to manager system 110 can tag sent data with various data tags including a time stamp and a geostamp (current location) as well as vehicle identifier tag mapping to being provided by a VIN number.

Client computer devices 130A-130Z can be client computer devices of users of system 100. According to one embodiment, each client computer device of client computer devices 130A-130Z can be associated to a certain user. Each of the different client computer devices 130A-130Z can be associated to a different user. Regarding client computer devices 130A-130Z, a computer device of client computer devices 130A-130Z according to one embodiment can be a computing node based device provided by a client computer, e.g. a mobile device, e.g. a smartphone, tablet, laptop, or smartwatch that runs one or more program, e.g. including a web browser for opening and viewing webpages such as webpages displaying graphical user interfaces (GUIs).

Administrator client computer devices 142 respectively associated to enterprise systems 140A-140Z can be computing node based devices provided by client computer devices, e.g. a desktop computer, a mobile device, e.g. a smartphone, tablet, laptop, or smartwatch, that run one or more program, e.g. a web browser for opening and viewing webpages such as webpages for providing GUI functionality.

Enterprise systems 140A-140Z can be computing node based systems associated to enterprises such as business or government enterprises with an interest in transportation of vehicles. According to one example, enterprise systems of enterprise systems 140A-140Z can be provided by transportation services companies that provide vehicle transportation services such as trucking companies, taxi cab companies, limousine service companies, and the like. Enterprise systems of enterprise systems 140A-140Z can include ride sharing service companies wherein users driving their own motor vehicles provide transportation services to other users of behalf of the ride sharing enterprise. Enterprise systems of enterprise systems 140A-140Z can include government agency enterprise systems such as motor vehicle departments associated to a state government. Enterprise systems of enterprise systems 140A-140Z can also include insurance companies who provide insurance carrier coverage to operators of motor vehicles.

Weather service system 150 can provide weather data, such as weather forecast data, historical temperature data, data on road conditions. Weather forecast data can include e.g. data on forecasted temperature and wind conditions, data on forecasted precipitation including rain and snowfall, data on predicted storm events, and the like.

Geo-classification system 160 can associate venues to spatial coordinate ranges associated to the venues. Geo-classification system 160 can include enhanced spatial maps pre-marked with tags to indicate uses associated with map features. Map features can include venues having associated venue areas including venue building areas and/or associated venue parking areas. An enhanced map can include tags specifying usage classifications of venues, e.g. residential, business, public and the like. An enhanced map can be tagged to tag features of a map including e.g. roads, bodies of water and infrastructure features such as building walls (exterior and interior) defining enterprise venues. In some cases an enhanced map can be tagged so that that different parts of a building are tagged differently, e.g. a doorway can be tagged differently from a conference room. Geo-classification system 160 can provide data tags associated to locations that specify uses associated with various locations. Geo-classification system 160 can cognitively map venues identified by venue identifiers, e.g. names, addresses, venue type classifications, and the like, to coordinate location ranges associated to the various venues. Accordingly, manager system 110 querying geo-classification system 160, with location data in the form of coordinate location data, can return a venue identifier and a venue type identifier. Further, geo-classification system 160 can cognitively map venues that are listed in geo-classification system with uses associated with such venues, e.g. whether such venues are for residential use or business use and include a variety of additional or alternative use classifications, e.g. public use, roadway use, waterway use, and the like. An enhanced map can be tagged to tag features of a map, including e.g. roads, bodies of water and venues. Venues can be provided e.g. by open spaces, such as developed open spaces or undeveloped open spaces, buildings such as open roof building or closed roof buildings, and/or open spaces associated to buildings, such as building associated with a parking lot. For each venue, geo-classification system 160 can associate e.g. identifiers for the venue, ranges and coordinate locations associated with the venue, features associated to the venue, such as building infrastructure features, parking lot features, and other features.

Traffic service system 170 can provide data on traffic conditions within a geospatial area being serviced by system 100, e.g. can report on traffic jams, accidents, and the like. Traffic service system 170 can provide data feeds such as video data feeds of traffic intersections and other points of interest distributed throughout associated roadways within a geospatial area being serviced by system 100.

Embodiments herein recognize that there is a need to make roadways safer. Users who drive motor vehicles can accumulate driver records over time as maintained by government agencies such as state associated motor vehicle departments. While records associated with driver infractions of motor vehicle ordinances can be helpful in assessing a driver's skill, the records can be incomplete. For example, an attenuated time period often exists between a time that traffic infraction occurs and a time that the infraction appears on a motor vehicle record. Accident records can similarly form an incomplete record of driver skill. For example, accident records cannot account for situations where a driver performed less than optimally while driving but managed perhaps out of good fortune to avoid an accident. Embodiments herein set forth to automatically detect IoT sensor device output data from a motor vehicle system and to iteratively update a driver's safety record based on an analysis of the collected IoT sensor device output data. Embodiments herein based on collected data can predict driver's safety performance under a variety of possible conditions and an in dependence on a result of processing of IoT sensor device output data, restrict a driver from driving a motor vehicle and/or can make recommendations as to how a motor vehicle can be driven.

Data repository 108 of manager system 110 can store various data. Data repository 108 in users area 2121 can store data on users of system 100 who are human individual users of system 100 and who can be associated to respective ones of client computer devices 130A-130Z. Data repository 108 in users area 2121 can store identifiers for users such as universally unique identifiers (UUIDs) that are assigned to users when users register into system 100.

Data of users area 2121 can include a driver safety record for each user, which can indicate the degree to which a driver drives safely. Such a driver safety record can include data of a driver's ability to drive safe under a variety of different classifications of driving environments, including, e.g. vehicle type classification, last activity classification (the last activity of a driver user prior to a trip), a roadway classification, e.g. city, highway, suburban, or rural, a time of day classification, e.g. daytime or night time, a weather classification, e.g. sunny, rainy, snowy, and a length of trip classification, e.g. first 20 minutes of a trip, minutes 20-60 of a trip, minutes 60-120 of a trip, and so on. The length of trip classification can be regarded to be an elapsed time of trip classification. Users area 2121 can include trip data of users such as trip data indicating driver performance on trips when a user acted as a driver. Driver performance data can be defined by IoT sensor output data as set forth herein. Manager system 110 can store data in users area 2121 of data repository 108 based on permissions to store data granted by respective users of system 100. Manager system 110 can include an opt-in/opt-out mechanism that allows a user to opt-out of a prior permission to store user data. System 100 can be configured so that responsively to a user opting out of a prior permission to store user data, the user data of the opting out user is automatically and permanently deleted from data repository 108.

Data repository 108 in vehicles area 2122 can store data on vehicles for use in system 100 which can be registered vehicles of system 100. Data repository 108 in vehicles area 2122 can include, e.g., UUIDs assigned to registered vehicles, VIN numbers which can be cross referenced to vehicle model, year and vehicle configuration data, vehicle ownership record of accidents associated with the vehicle, a record of maintenance events associated with the vehicle, and the like. Vehicles area 2122 can store data respecting trips performed by respective vehicles of system 100, including up-to-date data of a current trip. Trip data can include such data as routes travelled, a user driver associated to a trip, and passenger users associated to a trip. Thus, data of users area 2121 can be linked to data of vehicles area 2122.

Data repository 108 in maps area 2123 can include data of roadways within a geospatial area being serviced by system 100. Manager system 110 can iteratively query data of geo-classification system 160 to obtain updated data on roadways within a geospatial area being serviced. Maps area 2123 can store data on the geometrical configuration of various roadways, e.g. the width, the placement of roadway, markings (such as lane markings) on various roadways.

Data repository 108 in enterprises area 2124 can include data on enterprises and make use of services provided by system 100 and who are associated with respective ones of enterprise systems 140A-140Z. Data of enterprises area 2124 can include, e.g. names of an enterprise, identifiers for an enterprise (e.g. UUIDs), contact information associated with each enterprise, and configuration data of the enterprises. For example, administrator users associated with an enterprise can define configuration data that specifies content of notifications in the form, e.g. of reports that can be sent by manager system 110 to an enterprise. Enterprises making use of services provided by system 100 can include, e.g. transportation enterprises, government enterprises, insurance enterprises, and similar.

Data repository 108 in models area 2125 can include models used by manager system 110 for return of predictions. Models of models area 2125 can include for example models that are trained by machine learning processes.

Manager system 110 in decision data structures area 2126 can store various decision data structures for use by manager system 110 for return of action decisions. Action decisions can include, e.g. action decisions to restrict certain driver user from driving a certain vehicle, action decision to prompt for a replacement driver, action decisions to prompt for a certain driver amongst a set of candidate drivers, and the like.

Manager system 110 can run various processes. Manager system 110 running detection process 111 can include manager system 110 detecting that a user is located within a vehicle and can also perform processes to detect an identity of a user, e.g. by facial recognition. Manager system 110 running detection process 111 can include manager system 110 obtaining data from one or more IoT sensor devices distributed within a vehicle. Such IoT sensor devices can include for example a weight sensor that senses a person sitting in a driver's seat and/or a camera sensor that outputs a digital image representation of a user including a facial representation of a user. Manager system 110 can process received data from one or more IoT sensor devices for detection that a user is located in a vehicle and can determine an identification of such user, e.g. by facial recognition processes. Facial recognition processes can for example identify facial features by extracting landmarks or features from an image of a subject's face. For example, an algorithm can examine relative size, position, and/or shape of a jaw, nose, cheekbones, or eyes. These features can then be used to search for other images with a matching set of characteristics. Facial recognition process can be, e.g. geometric or photometric. A facial recognition process can include use of, e.g. principle component analysis using eigenfaces, elastic bunch graph matching, linear discriminant analysis, hidden Markov models, and various other processes.

Manager system 110 running logging process 112 can include manager system 110 logging data such as IoT sensor output data of an IoT sensor system 122 when a vehicle performs a trip. Manager system 110 running logging process 112 can include associating to log data, classification tags that indicate a driving environment classification during a trip or a portion of a trip. Driving environment classifications can include such classifications as, e.g. vehicle type classification, last activity classification, a roadway classification, a time of day classification, a weather classification, and an elapsed time of trip classification as set forth herein.

Manager system 110 running prediction process 113 can predict a level of safety exhibited by a user when driving on a proposed trip. For return of a prediction as to the exhibited level of safety, manager system 110 can determine an expected driving environment classification associated with a proposed trip and can use historical driving performance data of a user defined by IoT sensor output data as classified according to driving environment classification.

Manager system 110 running action decision process 114 can return action decisions in dependence on a result of a returned prediction returned by running of safety prediction process 113. Manager system 110 running action decision process 114 can include use of one or more decision data structure, such as an action decision table or decision tree.

Manager system 110 running machine learning process 115 can iteratively train a predictive model used by manager system 110 for return of predictions. Manager system 110 running machine learning process 115 can include manager system 110 training a predictive model using obtained data obtained by performance of a trip.

Referring now to FIG. 2, FIG. 2 depicts a physical schematic view of system 100 as shown in FIG. 1. System 100 can include manager system 110 in communication with various computing node based devices, such as client computer devices 130A associated to user 129A and client computer device 130B associated to user 129B, who is depicted as being in the seated driver position in vehicle 119 and who is position as the driver of vehicle 119.

Manager system 110 can be in communication with vehicle system 120A, which can include various IoT sensor devices defining IoT sensor system 122 associated with vehicle system 120A. IoT sensor devices defining an IoT sensor system 122 of vehicle system 120A can include, e.g. IoT sensor devices 122A-122M, which can be engine disposed IoT sensor devices, IoT sensor device 122N, which can be a camera based IoT sensor device for sensing or collecting image data representing driver user 129B (including facial features of driver user 129B), IoT sensor devices 1220-122P, for sensing braking of vehicle 119, and IoT sensor device 122Q which can be provided by a global positioning sensor (GPS) sensor for sensing coordinate location of vehicle 119 and for providing sensor output data specifying coordinate location of vehicle 119. Vehicle system 120A can include a plurality of additional IoT sensor devices for sensing attributes of driver performance.

With use of system 100, various services can be made available. According to one example, user 129A can be a user using a ride share service (ACME ride sharing service in the example of FIG. 2) and user 129B is a driver of the ride share service. User 129A using client computer device 130A associated to user 129A can activate a camera sensor of client computer device 130A to obtain an image data representation of license plate 124 of vehicle 119. In response to receipt of the uploaded data from client computer device 130A, manager system 110 can subject the image representation of license plate 124 to optical character recognition to return a text representation of license plate 124 and can look up a vehicle ID associated to the license plate number of license plate 124. User 129A can upload the image data to manager system 110 which can automatically, in response thereto, look up an identifier, e.g. a UUID for vehicle 119. Manager system 110 can examine data associated with the vehicle ID and can, based on the examination, identify that user 129B is a registered user of system 100 who is currently located within vehicle 119.

Figure 4:
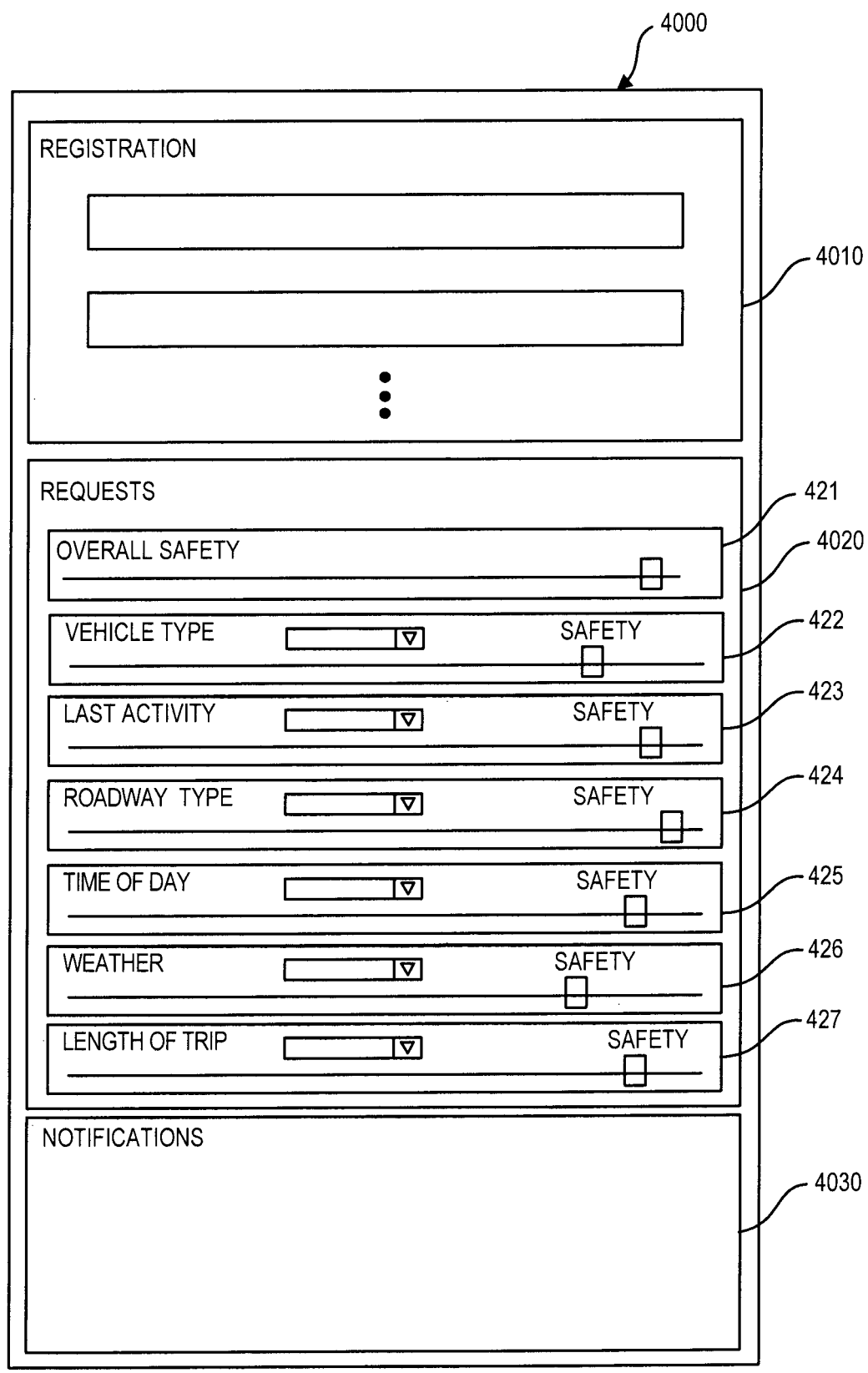
FIG. 4 depicts a user interface according to one embodiment.

User 129A can use area 4010 and/or 4020 of user interface 4000 as depicted in FIG. 4 to enter registration data (area 4010) or request data (area 4020) to define configuration data that establishes a targeted predicted safety level associated to a proposed trip that has been proposed by user 129A. Manager system 110 can perform a prediction as to driver user's (e.g. user 129B) exhibited safety level performance during the proposed trip, and if the predicted safety level is within the performance requirements set by the user, the driver can be qualified, or alternatively ca be disqualified if the predicted safety performance does not satisfy one or more criterion specified by a user. Driver user 129B can be qualified to perform the driving associated with the proposed trip, if the predicted exhibited safety level of driver user 129B is within requirements defined by user 129A e.g. using area 4010 or area 4020.

Notifications area 4030 of user interface 4000 displayed on client computer device 130A can include, e.g. text based data specifying vehicle ID, driver ID, a safety rating for driver user 129B, a predicted trip safety level for the proposed trip defined by user 129A, qualification status, i.e. whether driver user 129B is qualified or not qualified and area 4030 that allows user 129A to define safety parameters associated to a proposed trip.

Manager system 110 can be capable of performing predictions as to exhibited safety level exhibited by user 129B when travelling alternative routes. For example, embodiments herein recognize that some drivers can be predicted based on historical data to drive more safely when driving on rural roadways rather than city roadways. Accordingly, alternative routes can generate differentiated predicted safety level performance data.

Figure 3A:
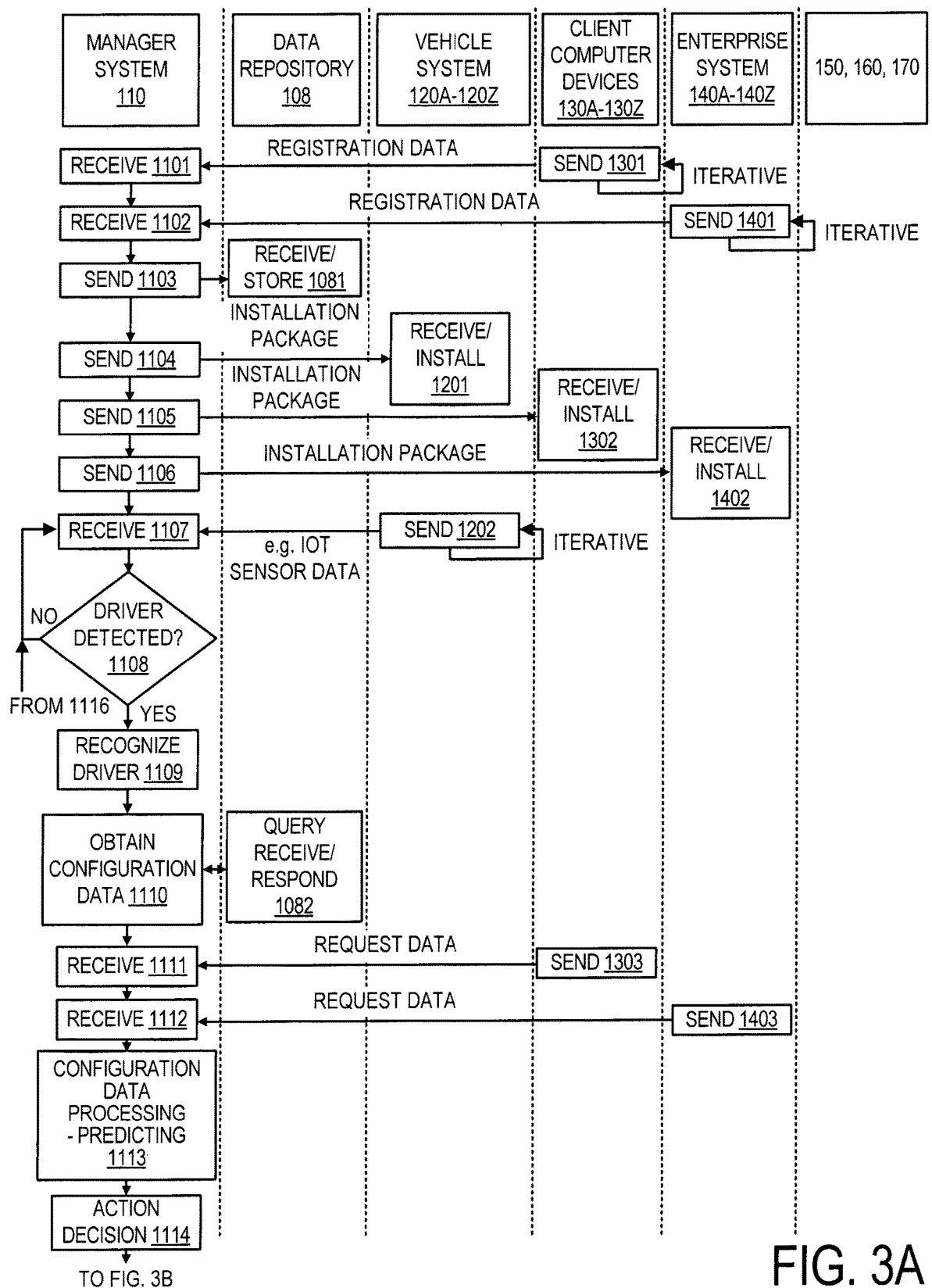
FIGS. 3A-3B is a flowchart illustrating a method that can be performed by a manger system interoperating with other components according to one embodiment.
Figure 3B:
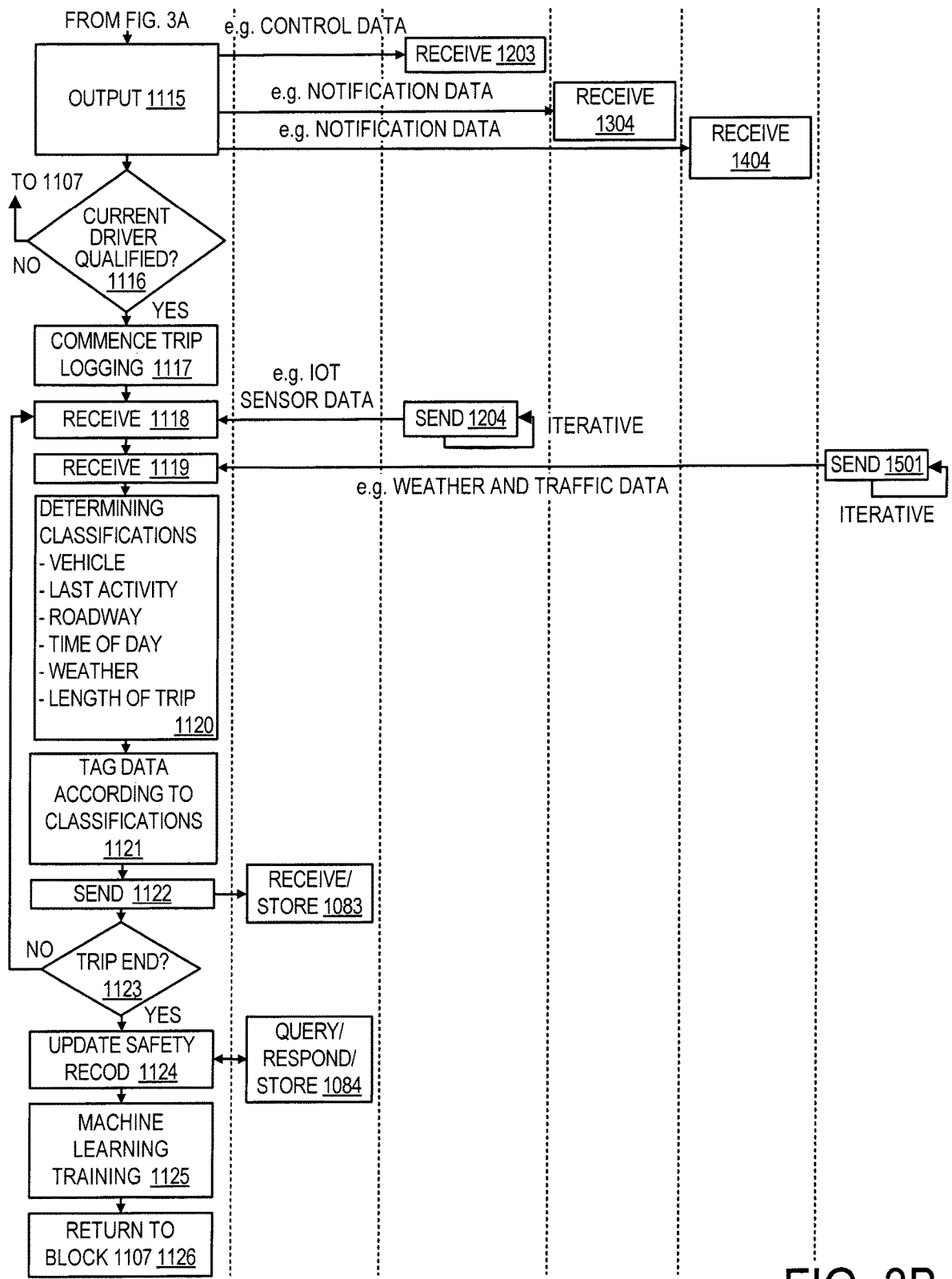

A method for performance by manager system 110 interoperating with vehicle systems 120A-120Z, client computer devices 130A-130Z, enterprise systems 140A-140Z, and systems 150-170 is described in reference to the flowchart of FIGS. 3A-3B. At block 1301 client computer devices 130A-130Z can be sending registration data for receipt by manager system 110 at block 1101 and at block 1401 enterprise systems 140A-140Z can be sending registration data for receipt by manager system 110 at block 1102. In response to the receipt of the registration data at blocks 1101 and 1102, manager system 110 can register users sending registration data at block 1301 and enterprise sending registration data at block 1401 as registered users and enterprises, respectively, of manager system 110. On receipt of the registration data at blocks 1101 and 1102, manager system 110 can proceed to block 1103. At block 1103, manager system 110 can send registration data for receipt by data repository 108 at block 1081. In response to receipt of registration data from users and enterprises, manager system 110 can assign UUIDs to registering users and enterprises.

Users defining registration data sent at block 1301 and administrator users defining registration data for their associated enterprises can be defined using a user interface such as a displayed user interface for display on a client computer device 130A-130Z or administrator client computer device 142. User interface 4000 (FIG. 4) can include registration area 4010, requests area 4020, and notifications area 4030. With use of area 4010 registration data can be entered. Registration data can include, e.g. user or enterprise name, address, contact information, and the like. Registration data specified in area 4010 can also include vehicles associated to a user or enterprise such as vehicles owned and/or operated by a user or enterprise. Entered registration data can include registration data that defines configuration data e.g. configuration data that specifies requirements of drivers. On receipt of registration data specifying a user, manager system 110 can assign a UUID to each new user registered into system 100. On receipt of registration data specifying an enterprise, manager system 110 can assign a UUID to each new enterprise registered into system 100. On receipt of registration data specifying a vehicle, manager system 110 can assign a UUID to each new vehicle registered into system 100. On completion of block 1103 manager system 110 can proceed to blocks 1104, 1105, and 1106.

At block 1104, manager system 110 can send an installation package to newly registered vehicle systems of vehicle systems 120A-120Z for receipt and installation at block 1201. Manager system 110 at block 1105 can send an installation package for receipt and installation by client computer devices 130A-130Z at block 1302. Manager system 110 at block 1106 can send an installation package for receipt and installation by enterprise systems 140A-140Z for receipt and installation at block 1402. An installation package received and installed at block 1201 can include, e.g. libraries and executable code that facilitate an installing vehicle system to provide functionality in support of services provided by system 100. Such functionalities can include, e.g. functionalities so that a vehicle system 120A-120Z can respond to communications from manager system 110, e.g. communications control a motor vehicle engine or driver environment, e.g. involving seat level adjustment, steering wheel adjustment, and the like. An installation package received and installed by client computer devices 130A-130Z at block 1302 can include, e.g. libraries and executable code facilitating functions in support of services provided by system 100. Such functions can include, e.g. functionality defined by an application that allows users to define requests as set forth herein. A request can be a request to specify requirements for drivers who are qualified to drive on a proposed trip or a request to determine and present options in regard to a proposed trip.

The installation package received and installed by enterprise systems 140A-140Z at block 1402 can include, e.g. libraries and executable code facilitating functionality so that enterprise systems 140A-140Z support functions in support of services provided by system 100. Such functions can include functions, e.g. as defined by an application that allow an enterprise, e.g. by an administrator user, to define requests as set forth herein.

Requests for example can define restrictions on driving with respect to a proposed trip. Alternatively, a request can be a request from manager system 110 to determine and present options in regard to a proposed trip. A user or administrator user using area 4010 can define registration data provided by configuration data that configures default settings associated to vehicles that are associated to a user or an enterprise. Default settings can include default settings to restrict drivers, e.g. who do not have a qualifying safety record from driving a vehicle or configuration data can be defined so that vehicles associated to a user or an enterprise present prompts to a user when certain conditions apply, e.g. prompting a change of a current driver or recommending a certain driver for driving out of a set of candidate drivers or recommending an alternative route for a proposed trip that would optimize a predicted exhibited safety level exhibited by a driver. Manager system 110 on completion of block 1106 can proceed to block 1107.

At block 1107 manager system 110 can receive IoT sensor data from vehicle system 120A-120Z. In the described example, manager system 110 at block 1107 receives IoT sensor data from vehicle system 120A. At block 1202 vehicle system 120A can iteratively send IoT sensor data for receipt by manager system 110 at block 1107. The IoT sensor data sent at block 1202 can include, e.g. seat associated weight sensor data and camera image data representing a user within a vehicle including facial features of the user. An IoT sensor device provided by a camera sensor can be oriented to obtain image data representations of a user seated in a driver's seat of a vehicle. In response to completion of block 1107, manager system 110 can proceed to block 1108.

At block 1108, manager system 110 can determine whether a driver is detected, e.g. by weight sensing or by another process such as a key being activated or by a determination examining location data such as GPS output location data indicating that a user and a vehicle are in a common location. If at block 1108 a driver is not detected, manager system 110 can return to block 1107 and can iteratively perform blocks 1107 and 1108 until a driver is detected. When a driver is detected, manager system 110 can proceed to block 1109.

At block 1109, manager system 110 can perform a process to recognize a driver, e.g. using image facial recognition as set forth herein in connection with the description of detection process 111 described in connection with FIG. 1. In response to a driver being recognized, manager system 110 at block 1109 can send data to data repository 108 for receipt and storage by data repository 108 at block 1082. The stored data stored at block 1082 can include data indicating, e.g., in users area 2121 and vehicles area 2122 specifying that a certain user having a certain user ID registered in system 100, is located within a certain vehicle, also registered by system 100. In response to completion of block 1109, manager system 110 can proceed to block 1110.

At block 1110, manager system 110 can obtain configuration data defined by received registration data and/or received request data. Configuration data can, according to one embodiment, define restrictions on drivers who are qualified to drive a vehicle for a proposed trip. Manager system 110 based on obtained configuration data can determine and present prompts prompting, e.g. alternate drivers for driving a vehicle and/or alternate routes for a trip in dependence on a predicted exhibited safety level associated to a driver. Prior to a time that a driver is detected at block 1108 configuration data can be defined by users and enterprises by administrator users associated to such enterprises. A user can define configuration data by entering registration data and/or request data using user interface 4000 (FIG. 4).

Manager system 110 performing obtaining configuration data at block 1110 can include manager system 110 performing multiple queries of data repository 108 as indicated by data repository 108 performing query receive and respond block 1082. In response to completion of block 1110, manager system 110 can proceed to blocks 1111 and 1112, wherein manager system 110 can receive updated configuration data defined by request data.

Client computer devices 130A-130Z, e.g. can be iteratively sending request data at block 1303 and enterprise systems 140A-140Z can be iteratively sending request data at block 1403. On receipt of block 1112 manager system 110 can proceed to block 1113.

According to one embodiment, a user (general user or enterprise user on behalf of an enterprise) can enter request data defining configuration data using area 4020 of user interface 4000 (FIG. 4). A user can specify various criterion for qualifying a driver for a specified vehicle and/or proposed trip in terms of predicted exhibited safety performance (using area 421) e.g. as may be determined using Eq. 1 and/or predictive model (FIG. 5), predicted safety performance for a specified vehicle type (using area 422), predicted safety performance for a specified last activity (using area 423), predicted safety performance for a specified roadway type (using area 423), predicted safety performance for a specified time of day (using area 425), predicted safety performance for specified weather conditions (using area 426) and predicted safety performance for a specified length of trip (using area 427). A user can specify detailed multiple criterion driver requirements using area 4020. If a user wishes to qualify for a trip only drivers who have impeccable predictable safety performance when driving light duty trucks, at night, in the snow, that can be specified using areas 422, 425, and 426. In area 4020 or area 4010 a user can specify a specific trip for driver qualification, a specific vehicle to be driven for driver qualification, and/or can specify a specific driver for driver qualification. Registration area 4010 can have areas 421-427 so that a user can enter registration data defining driver qualifying configuration data with entered registration data entered using area 4010.

At block 1113, manager system 110 can perform configuration data processing. Manager system 110 performing configuration data processing at block 1113 can include manager system 110 performing processing for return of an action decision. The action decision can be an action decision, for example, to impose a restriction on driving of a vehicle and/or can include an action decision to present and facilitate driving options such as options wherein an alternate route is driven and/or an option where an alternative driver can be recommended for driving a vehicle.

Manager system 110 performing configuration data processing at block 1113 can include manager system 110 performing predicting. The predicting at block 1113 can include, for example, predicting a present driver's performance in driving a vehicle on a currently proposed trip. According to some use cases predicting at block 1113 can include alternatively or in addition, predicting performance of alternate drivers such as passenger users presently located within a vehicle and driving the vehicle on a currently proposed trip. Manager system 110 can determine identities of all currently present passengers within a vehicle by examining location data of the users with reference to location data of the current vehicle. In determining that a user is presently located within a vehicle by location data of the user matching location data of the vehicle, the location data of the vehicle and of users according to one example can be provided by GPS sensor output data. Manager system 110 in response to completion of block 1113 can proceed to block 1114.

At action decision block 1114, manager system 110 can employ one or more decision data structure to return an action decision. For example, manager system 110 can use one or more of a decision table or a decision tree. An action decision returned at block 1114 can include for example, an action decision to restrict driving of the current vehicle by a certain driver user and/or can include and action decision to return options to users such as options involving alternative routes and/or alternative drivers. Manager system 110 on completion of block 1114 can proceed to block 1115.

At block 1115, manager system 110 can provide one or more output to perform the action decision returned at block 1114. Manager system 110 providing one or more output at block 1115 can include, for example, manager system 110 sending control data to vehicle system 120A for receipt by vehicle system 120A at block 1203. Control data received and responded to at block 1203 can include control data to restrict operation of vehicle system 120A, e.g. according to one embodiment vehicle system 120A can be disabled, i.e. prevented from starting if a current driver, e.g. situated in a driver's seat, is disqualified from driving the vehicle according to configuration data in dependence on one or more returned prediction.

Control data received and responded to at block 1203 can in addition or alternatively include such data as data to change operation of a vehicle associated to vehicle system 120A, e.g. can disable according to one embodiment high gear operation and limiting a driver to use a vehicle only in accordance with lower gear operation. Control data received and responded to at block 1203 can alternatively or in addition to include control data to adjust the driver environment, e.g. involving steering wheel or seating setting of the driver. Control data received and responded to at block 1203 can include data to reject one or more certain driver, i.e. disabling a vehicle if such driver is in a driver's seat and can enable operation of the vehicle if a qualified is situated in a driver's seat, i.e. where a qualified driver is recognized by facial recognition processing as set forth herein is situated in a driver's seat control data can include control data so that a vehicle associated with vehicle system 120A is enabled to be started if on the condition that a qualified driver is recognized as being situated in a driver's seat.

Manager system 110 providing one or more output at block 1115 can include manager system 110 sending notification data for receipt by client computer devices 130A-130Z at block 1304. Such notification data can be displayed in notifications area 4030 of user interface 4000 which can include for example, text based data specifying, e.g. that a certain user is qualified as driver, not qualified as a driver, and/or text based data specifying options such as alternative routes and options recommending a certain qualified driver out of a set of candidate drivers.

Manager system 110 providing one or more output at block 1115 can include manager system 110 sending notification data for receipt by enterprise systems 140A-140Z at block 1404. Receipt of notification data at block 1404 can result in a text based notification being displayed in notifications area 4030 of an administrator users instance of user interface 4000. Displayed notification data can include notifications to an enterprise, for example, that a current driver is not qualified and that certain other alternative candidate drivers are qualified and/or can specify text based recommendations recommending, e.g. alternative routes and/or alternative drivers. On completion of block 1115 manager system 110 can proceed to block 1116.

At block 1116, manager system 110 can determine whether a current driver; namely, the driver currently situated within a driver's seat of the vehicle associated with vehicle system 120A is qualified to drive the current vehicle. Manager system 110 for determining that a current driver is qualified can examine predicted performance data for the driver with reference to configuration data obtained at blocks 1111-1112 defining predicted safety performance one or more criterion that has been established for a specified vehicle, trip and/or driver using area 4010 or 4020 of user interface 4000. If the current driver is not qualified, manager system 110 can return to block 1107 to iteratively receive additional IoT sensor data, e.g. including weight sensor data and/or image data of a driver for processing by using facial image recognition processes as set forth herein until a driver situated within a driver's seat is qualified to drive a current vehicle. Thus, according to one embodiment, system 100 can provide interactive feedback to users so that users are prompted to replace a current driver with a new driver until a new driver is situated in a driver's seat is recognized by manager system 110 as a qualified driver user. Manager system 110 in response to completion of block 1107 can iteratively perform the loop of blocks 1107-1116 until it is determined that a qualified driver is situated in a driver's seat of a vehicle associated to a vehicle system 120A.

It should be noted according to one embodiment, that according to configuration data that can be defined by a user or an enterprise by an administrator user using registration area 4010 or requests area 40120 of user interface 4000 of FIG. 4, system 100 may not restrict a driver from operating a vehicle by disabling a vehicle and preventing an engine start, and may not otherwise alter mechanical operation of a vehicle but rather according to one scenario can merely present prompts and text based recommendations without implementation of mechanical changes changing the functionality of a vehicle associated to vehicle system 120A.

On determining at block 1116 that a current driver is qualified to drive the vehicle associated with vehicle system 120A, manager system 110 can proceed to block 1117.

At block 1117, manager system 110 can commence trip logging. Manager system 110 performing trip logging can include manager system 110 collecting driver safety indicating data and organizing that data, e.g. with use of data tags during the logging. Driver safety indicating data can be defined by IoT sensor data output by IoT sensor devices of IoT sensor system 122.

At block 1118, manager system 110 can be receiving IoT sensor data from IoT sensor devices of vehicle system 120A. Vehicle system 120A at block 1204 can be iteratively sending IoT sensor data from IoT sensor devices of IoT sensor system 122. On completion of block 1118, manager system 110 can proceed to block 1119.

At block 1119, manager system 110 can receive weather and traffic data from weather service system and traffic service system 170, respectively. The received weather and traffic data associated to one or more respective routes associated with a respective trip. Manager system 110 in response to completion of block 1119 can proceed to block 1120.

At block 1120, manager system 110 can determine driving environment classifications that are appropriately associated to IoT sensor data currently being logged. Weather and traffic data received at block 1119 can include weather and traffic data associated to the current location of the vehicle associated with vehicle system 120A for use in classifying the current driving environment associated to a vehicle. Manager system 110 determining driving environment semi-classifications of a vehicle at block 1120 can include determining such classifications as a vehicle type, a last activity of a user, a roadway, e.g. highway, city, suburban, or rural, time of day, e.g. daytime or nighttime, weather, e.g. as indicated by weather data associated to the current location of the vehicle, and elapsed time of the trip. For example, if the current trip is within a first defined time period, e.g. a first 10 minutes, the elapsed time classification can be assigned as elapsed time 1, whereas, if the current elapsed time is within the second defined time period, e.g. the 10-20 minute mark, the elapsed time classification can be assigned elapsed time 2, and so on.

Regarding vehicle classification, vehicle classification can refer to the type of vehicle, e.g. sedan, SUV, station wagon, light duty non-commercial truck, medium duty commercial truck, heavy duty commercial truck, semi tractor trailer, and so on. Manager system 110 can determine a vehicle classification by reading of vehicle specification data of vehicles area 2122 associated to a vehicle identifier which can be included as metadata of received IOT sensor data received from a vehicle.

The last activity classification can refer to a most recent activity of the user prior to the driver's current activity. Manager system 110 determining a last activity of a user can include manager system 110 examining location data of a user, e.g. using location data reported by the user's client computer device of client computer devices 130A-130Z. For example, if the user's last location was the office, the user's last activity can be determined to be "working", if the user's last location was the gym, the user's last activity can be determined to be "exercising", and so on.

Roadway classifications can include, e.g. city, highway, suburban, and rural. Manager system 110 can make the relatively coarse roadway classifications more granular with use of traffic data, e.g. can determine granular classification such as city, low traffic city, medium traffic city, heavy traffic city, and so on.

Manager system 110 can determine a time of day classification by reading timestamped data of IoT sensor data received at block 1119. System 100 can be configured so that all IoT sensor data sent at block 1204 is timestamped by vehicle system 120A.

Manager system 110 can determine a weather classification by identifying received weather data received at block 1119 associated to a current location of the vehicle associated to vehicle system 120A. Based on received weather data, a weather driving environment classification can include such classification as "sunny", "cloudy", "rainy", "snowy", or similar.

Manager system 110 for determining an elapsed time classification can examine a current time in reference to a "start time" that can be activated previously at block 1117. Manager system 110 on completion of block 1120 can proceed to block 1121. Regarding the elapsed time of trip classification, embodiments herein recognize that some users may exhibit different levels of safety performance in dependence on the elapsed time of a current trip. For example, some users may tend to exhibit safer driving patterns early on in a trip, than later in a trip, such as hours after a trip has commenced.

At block 1121, manager system 110 can tag received IOT sensor data with data tags specifying the determined driving environment classifications determined at block 1120. Thus, each item of data can include a plurality of driving environment tags in addition to including baseline data tags such as a timestamp and a geo-stamp (specifying a location of the vehicle when the sensor data was output) and vehicle identifier. Each item of IoT sensor data received at block 1118 can include a vehicle type tag, a last activity tag, a roadway tag, a time of day tag, a weather tag, and an elapsed time tag. On completion of block 1121, manager system 110 can proceed to block 1122.

At block 1122, manager system 110 can send tagged IoT sensor data for receipt and storage by data repository 108 at block 1083. On completion of block 1122, manager system 110 can proceed to block 1123.

At block 1123, manager system 110 can determine whether the current trip has ended. If the current trip has not ended, manager system 110 can return to block 1118 and can perform a next iteration of the loop including blocks 1118-1123. It will be seen that during each iteration of the loop of blocks 1118-1123, manager system 110 can change one or more current driving environment classification from a driving environment classification of a preceding iteration. For example, while the vehicle and last activity classifications can remain constant throughout a trip, other classifications can change while a trip commences. For example, the roadway classification can change, e.g. as a vehicle transitions from city to highway, the time of day can transition as time passes, the weather classification can change as time passes, and the elapsed time of a trip classification can change as time passes. When manager system 110 at block 1123 determines that a trip has ended, e.g. by the vehicle associated with vehicle system 120A stopping, manager system 110 can proceed to block 1124.

At block 1124, manager system 110 can update a driver safety record. Manager system 110 updating a driver safety record for the user can return a driver safety record for the driver of the recently completed trip determined to have concluded at block 1123. Manager system 110 can apply a variety of criterion for determining a driver user's safety record for a trip. According to one example, manager system 110 can apply a point scoring system wherein a driver for a trip accumulates positive points when driving without error but manager system 110 can apply negative points when error events are detected.

Manager system 110 can detect using receive IoT sensor data such error events as (a) swerving, as may be detected with use of a wheel and/or steering wheel disposed IoT sensor device; (b) crossing lane markers, as may be detected with use of IoT sensor data provided by GPS sensor output data cross-referenced to roadway configuration maps data specifying lane markers as may be specified in maps area 2123 of data repository 108; (c) near misses of collisions with other vehicles, as may be determined by IoT sensor device output data provided by a sensor of a vehicle's standard collision avoidance system; (d) turning to talk to passenger events, as may be determined with use of IoT sensor device output data output by a camera device disposed for collection of image data representing a user including the head portion of a user; (e) tailgating events, as may be detected with use of IoT sensor device output data included as part of a vehicle's standard collision avoidance system; (f) excessive acceleration, as may be determined with use of IoT sensor device for sensing acceleration of a vehicle; (g) hard braking, as may be determined with use of IoT sensor device output data disposed to sense braking of a vehicle; (h) speeding events wherein the vehicle's speed exceeds a posted speed, as may be determined using an IoT sensor device for sensing speed of a vehicle as compared to a posted speed limit as may be determined by reference to data of maps area 2123 of data repository 108; (i) traffic violations, as may be determined by examination of traffic data, of traffic data received at block 1119, which traffic data can include according to some embodiments, image data output by a camera sensor mounted on vehicle 119 (FIG. 2) or disposed at an intersection or at other locations where a traffic infraction can occur; (j) texting events (where a driver uses his or her client computer device to send a text while driving) as may be determined by examining data from an in vehicle camera IOT sensor device or and/or by examining received from a touch screen sensor of a client computer device of a user. Regarding error event detection as described herein, detected error events can be tagged with timestamps, wherein the timestamps are selected to specify the time of a timestamp of underlying sensor data used for the event detection.

Where data used for determination of error events is obtained from data sources other than IoT sensor system 122 such as a data source provided by traffic service system 170 or a client computer device, such as client computer device 130B of a driver user as depicted in FIG. 2, that data can be tagged with driving environment specifying metadata in the manner described with reference to IOT sensor data in reference to blocks 1120-1121. Namely, timestamps of data from alternative sources such as a traffic service system or a client computer device can be examined and the data used can be classified using a driving environment classification determined at block 1120 for the timestamp in common with the timestamp of the external data source. Regarding error event detection as described herein, detected error events can be tagged with timestamps, wherein the timestamps are selected to specify the time of a timestamp of underlying sensor data used for the event detection. Manager system 110 can perform processing to associate data from a data source external to IOT sensor system 122 to the current vehicle. Manager system 110 can associate data from a camera sensor of traffic service system 170 by scanning a license plate by processing image data representing the current vehicle and determining that the scanned license plate identifies the current vehicle. Manager system 110 can associate data from a sensor of a client computer device to the current vehicle by lookup of device identifiers associated to the current driver of the current vehicle.

Manager system 110 at block 1124 can perform multiple queries of data of data repository 108 and can update data values of data repository 108 as they are determined as indicated by query respond and store block 1085 performed by data repository 108.

Manager system 110 at block 1124 on completion of returning the driver safety record for a current trip can aggregate that data to prior historical data driver safety record data of that user to update an overall driver safety record for the driver user. Manager system 110 for return of a trip driver safety record and for return of an updated driver safety record for the user can determine different driver safety record data for different classifications of driving environments such as the different driving environment classifications noted of vehicle type, last activity, roadway, time of day, weather, and elapsed time of tip. Manager system 110 at block 1124 for return trip safety record and driver safety record can return an overall trip safety record and an overall driver safety record and can also return a trip safety record and a driver safety record for each of the specified driving condition classifications; namely, vehicle type, last activity, roadway, time of day, weather, and elapsed time of trip. Thus, the recorded data at block 1124 can indicate driving environment classifications in which a driver user exhibits safer driving performance characteristic and classifications in which the driver exhibits less safe driving performance characteristics.

In some embodiments, manager system 110 at block 1124 can adjust the driver's safety record based on driver performance data received from enterprise systems 140A-140Z such as data relating to traffic infractions as may be tracked by a government enterprise system or driving accidents (collisions) as may be determined by an enterprise system provided by an insurance enterprise system. Data determined from enterprise systems can be tagged with driving environment classification tags as set forth herein, e.g. by examination of data records associated with traffic infractions and/or accidents or supplementing traffic infraction or accident reports with examination of historical data from a network data source, e.g. historical weather data available from weather service system 150 to determine weather associated with a traffic infraction or a collision.

Embodiments herein recognize that predictions as to safety and performance of a driver during a trip can be enhanced with use of the driving environment classifications and associated tagging as set forth herein. For example, with use of the driving environment classifications and tagging as set forth herein, a predicted safety performance of a driver is not universal for any proposed trip, but rather can be provided cognitively in dependence on a variety of factors such as the route of the trip, e.g. through city, highway, or other, other factors such as vehicle type, last activity, time of day, weather, and elapsed time of tip.

The ability to granularly and intelligently predict a driver safety performance provides for the return of safe alternative such as proposals involving recommendations for a different route for a current driver and/or or a different driver. Embodiments herein can avoid risk situations. For example, a certain driver may have a clean driving record and no accidents and may be recognized by other individuals as being a safe driver; however data logging functions reveal for example, that the driver user exhibits relatively unsafe driving patterns under rain conditions on rural roads. System 100 can detect such a situation where a current trip may encounter the noted conditions and accordingly activate a notification and/or a control, e.g. to prevent the driver from driving, to prompt an alternate route for the current driver, and/or to prompt an alternate driver.

Configuration data processing at block 1113 according to one embodiment is now further described in the context of use of driving environment classifications and associated data tags. As noted, configuration data defined based on entered registration data or request data into respective areas 4010 or 4020 of user interface 4000 (FIG. 4) can specify that manager system 110 is to perform a qualification check, e.g. qualifying a current driver for driving of a vehicle or not qualifying the driver.

Manager system 110 for performing a qualification check can perform predicting of a driver's safety performance in driving a vehicle during a trip and examine predicted performance data in reference to configuration data defining predicted driving performance one or more criterion. Manager system 110 at block 1113 for performing predicting of a user driver's safety performance during a trip, can use a scoring system and can return a predicted safety score. Manager system 110 for return of a predicted safety performance of a driver can apply a multifactor formula as set forth in Eq. 1.

$$S = F_1 W_1 + F_2 W_2 + F_3 W_3 + F_4 W_4 + F_5 W_5 + F_6 W_6 \quad \text{(Eq.1)}$$

Where S is a predicted score for the trip indicative of predicted driver safety performance, $F_1$-$F_6$ are factors, and $W_1$-$W_6$ are weights associated with the various factors. Referring to Eq.1, factor $F_1$ can be a vehicle type driving environment classification factor, factor $F_2$ can be a last activity driving environment classification factor, factor $F_3$ can be a roadway driving environment classification factor, factor $F_4$ can be a time of day driving environment classification factor, factor $F_5$ can be a weather driving environment classification factor, and factor $F_6$ can be an elapsed time of trip driving environment classification factor.

According to factor $F_1$, manager system 110 can provide a scoring value under factor $F_1$ based on rate of error events of a user driving a vehicle of a type in common with the current type of vehicle.

Manager system 110 can return a scoring value under factor $F_2$ based on historical driving error rate of the user when driving on a trip with a last activity being in common with the last activity of the current trip.

Manager system 110 using Eq. 1 can apply a scoring value under factor $F_3$ based on an error rate of the user driver when driving on a collection of roadways specified in a proposed route for a proposed trip.

Manager system 110 can apply a scoring value under factor $F_4$ based on an error rate of the user when driving according to a time of day classification in common with a time of day classification of a current trip.

Manager system 110 can apply a scoring value under factor $F_5$ based on a historical error rate of the user driver when driving under a weather classification in common with a weather classification or sets of forecasted classifications of the current trip.

Manager system 110 can apply a scoring value under factor $F_6$ based on historical error rates of the user when driving in accordance with elapsed time classifications expected for the current trip.

Accordingly, embodiments herein recognize that with use of Eq. 1, a predicted performance of a driver user can change in dependence on current driving environment classifications can a user's historical performance under different driving environment classifications.

Manager system 110 for determining the weights W1-W2 associated with the factors F1-F6 Eq. 1 according to one embodiment can employ mixed effect model processing to identify the importance of factors F1-F6, and can assign values to the weights in accordance with a returned data indicating an effect associated with each factor. Mixed effect model processing can be performed specifically and separately for each individual user driver, or mixed effect model processing can be performed for larger datasets such as users of specified classifications of users or all users.

Figure 5:
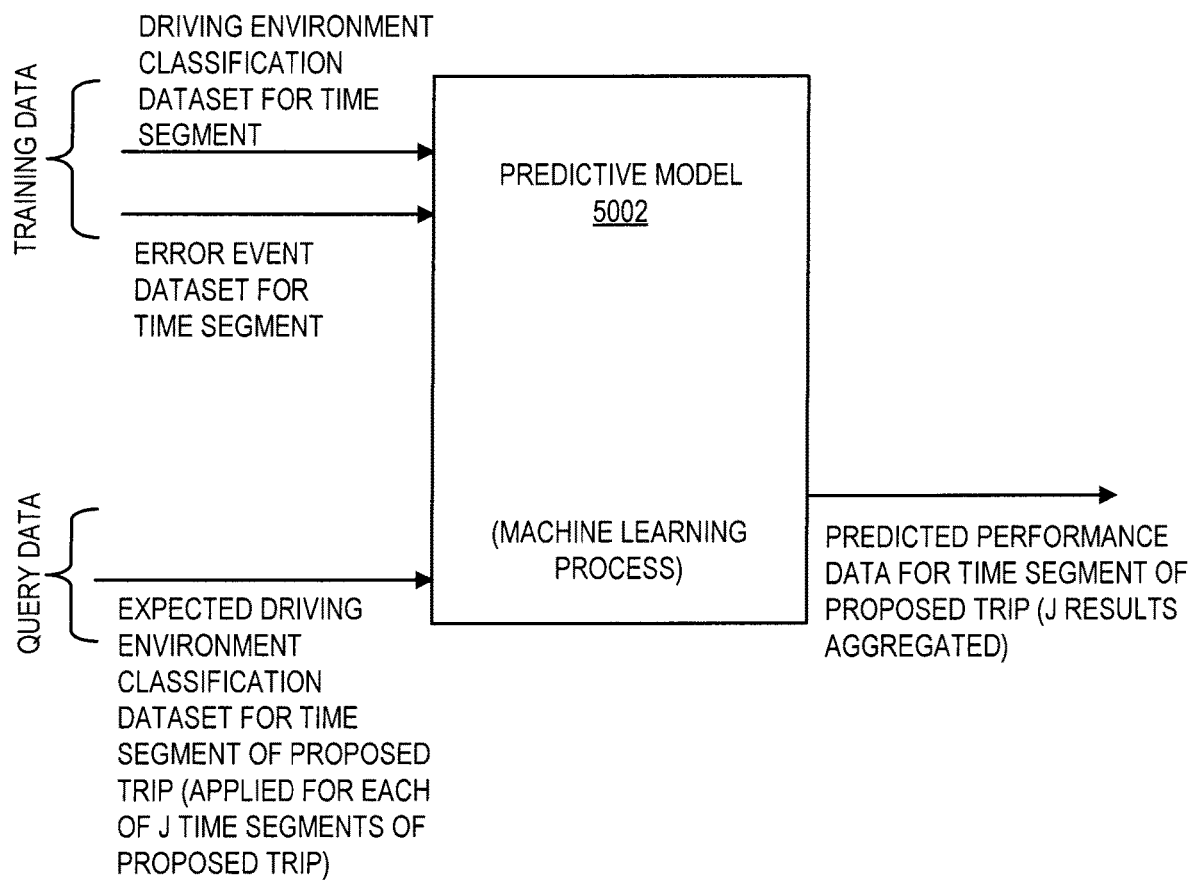
FIG. 5 depicts a predictive model that can be trained according to machine learning processes according to one embodiment.

Another process for return of predicted driver safety performance is explained with reference to predictive model as shown in FIG. 5. Manager system 110 for return of a driver's predicted safety performance can use predictive model 5002 as shown in FIG. 5. Predictive model 5002 can be trained with use of driving environment classification data as set forth herein. Predictive model 5002 can be trained using supervised machine learning processes. Predictive model 5002 can be trained with use of iteratively applied training data. An iteration of training data can include: (a) driving environment classification dataset for a time segment in combination with (b) an error event dataset for the time segment. Manager system 110 can train K instances of predictive model 5002, one for each driver user of system 100.

Training data for use in training predictive model 5002 can include data for a particular user broken into discrete, e.g. even time segments, such as 10 minute time segments, 5 minute time segments, or 1 minute time segments. The driver's overall driving history can be aggregated and the driver's overall driving history can be broken into time segments and data associated to the different time segments for a particular user can be applied as iterations of training data for training of an instance of predictive model 5002 for that particular so that predictive model 5002 learns driver safety patterns of a user in dependence on driving environment classifications.

Applied iterations of training data applied for training of predictive model 5002 can include: (a) a driving environment classification dataset for a given time segment and (b) an error event dataset for the given time segment. The driving environment classification dataset for a time segment refers to the set of driving environment classifications that apply for the time segment, e.g. the driving environment classifications for vehicle type, last activity, roadway, time of day, weather, and elapsed time of trip. The error event dataset for each time segment refers to a set of errors that occurred during the time segment. With such training data iteratively applied, predictive model 5002 can learn the dependency of error events and driving environment classifications. Predictive model 5002 once trained by supervised machine learning is able to respond to query data.

Predictive model 5002 can respond to query data provided by an expected driving environment classification dataset for a time segment. In response to such applied query data, predictive model 5002 can return a predicted error event dataset for a time segment.

Thus, in reference to predictive model 5002 manager system 110 can return a predicted safety performance for a driver using predictive model 5002 by breaking down a proposed trip into expected time segments, e.g. time segments corresponding to the period of the time segments associated with training data used for training predictive model 5002. For example, if a proposed trip is calculated to consume J time segments, query data can be applied to predictive model J times to return an overall predicted error event dataset for an entire trip. Manager system 110 can thus return a predicted score indicative of the driver's predicted safety performance during a proposed trip using predictive model 5002.

Manager system 110 at block 1114 can return various action decision in dependence on a prediction as to a driver's safety performance during a proposed trip. Referring to Table A, a decision data structure is described.

TABLE A

| ROW | PREDICTED SAFETY PERFORMANCE SCORE | ACTION DECISION |
|---|---|---|
| 1 | < p < 50 | Not qualified: Disable Vehicle |
| 2 | 50 ≤ p ≤ 70 | Qualified; Provide warning notification including driving environment report; modify vehicle performance |
| 3 | p > 70 | Qualified |

Referring to Table A, Table A sets forth a decision data structure for return of action decisions for qualification of a driver user as a driver of a vehicle. As indicated in Table A, manager system 110 can return an action decision in dependence on a predicted safety performance of a driver user. Referring to Table A, where a predicted performance safety score of a user is >50 according to an exemplary scoring system, the returned scoring decision is an action decision to not qualify the user as a driver. The action decision associated with Row 1 can include an action decision to disable vehicle. Accordingly, in regard to Row 1, where Row 1 is fired, the providing of one or more output at block 1115 to perform action in accordance with the action decision can include the sending of control data for receipt by vehicle system 120A at block 1203 to disable the vehicle, e.g. prevent the engine from starting for as long as the driver is recognized as being situated in a driver's seat, for example.

Referring to Row 2 of Table A, a different action decision can be fired in the case that the driver user's safety performance score was predicted to be at a mid-range, e.g. ≤50 and ≥70 in the scoring system described. With such a predicted performance score, a different action decision can be returned. Namely, the action decision that the user driver is qualified. However, with the qualification the action decision can specify that the user is to be provided with a "warning" notification including driving environment report. Also, the action decision associated with Row 2 can further specify an action decision to limit vehicle performance, e.g. the action decision can include an action decision to modify performance of the vehicle, e.g. to restrict highest gear operation of the vehicle.

Manager system 110 providing one or more output at block 1115 to perform the action decision specified in Row 2 of Table A can include, e.g. sending notification data for receipt by a client computer device at block 1304 for display of a notification in notification area 4030 of user interface 4000 of FIG. 4 and can include sending of control data for receipt by vehicle system 120A at block 1203 to limit performance of a vehicle, e.g. to disable a high gear driving mode.

With further reference to Table A, a predicted safety performance score of above 70 in the described example can return an action decision of "qualified". Manager system 110 can send a positive notification to the user at block 1115, e.g. a positive text based notification for display in notifications area 4030 of user interface 4000 (FIG. 4) confirming that the current driver user is a qualified driver.

As noted, configuration data and request data as set forth herein that can be defined by a user (general user or administrator user on behalf of an enterprise) can specify that manager system 110 presents options. Returned options presented by manager system 110 can be provided in the form of a text based notification, for example. According to one embodiment, manager system 110 providing one or more output at block 1115 can include manager system 110 sending a notification in the form predicted safety report to users. The user can include all users currently within a vehicle for which a safety prediction has been performed at block 1113. The predicted safety report can specify driving environment classifications that have been determined by manager system 110 to be problematic for the current driver user. For example, for determining problematic driving environment classifications, manager system 110 can determine whether any scoring values assigned under the individual factors F1-F6 of Eq. 1 have exceeded a threshold. For example, for determining problematic driving environment classifications, manager system 110 can identify time segments predicted using predictive model 5002 to return a large number of errors. Manager system 110 can isolate predicted error-prone time segments and can identify common driving environment classifications between the error-prone time segments and can, in a driving environment report, highlight such problematic common driving environment classifications commonly included among predicted error-prone time segments.

While Table A depicts an action decision where action decision are in dependence on overall predicted safety performance, alternative decision data structures may be invoked based on configuration data defined by a user. For example, where a user uses areas 422-427 to define performance criterion based on discrete factors (safety performance for a specific vehicle type, specific last activity, specific roadway type, specific time of day, specific weather condition, specific length of trip) different decision data structures can be invoked that specify actions in dependence on the discrete factors specified. For determining whether a predicted performance under a specific factor has been satisfied, manager system 110 can determine whether any scoring values assigned under the individual factors F1-F6 of Eq. 1 have exceeded a threshold, the threshold being in dependence on a user selection made using one or more of area 422-427.

As set forth herein, manager system 110 can provide one or more output at block 1115 to send notifications provided by text specified to users and enterprises as to routes to be taken for completion of a trip and/or as to drivers who may be recommended for driving a vehicle. Manager system 110 for presentment of options as to a route can query traffic service system 170 for returned options as to candidate alternate routes between a starting point and an end point of a proposed trip and traffic service system 170 can return a list of candidate alternate routes. Manager system 110 can then return a prediction as to the safety performance of the driver for each of the candidate routes, e.g. using one or more of the process described in connection with Eq. 1, or the process described in connection with predictive model 5002 as shown in FIG. 5. Thus, a predicted safety performance score for the driver can be returned for each route. With use of the predicted safety performance according to the different candidate routes an action decision can be returned, e.g. with use of the decision data structure set forth in reference to Table B.

TABLE B

| ROW | RESULT | ACTION DECISION |
|---|---|---|
| 1 | No alternate route is safer for current drive | Notification e.g. text based specifying that current route is the best route |
| 2 | One or more alternate route is safer for current driver | Notification e.g. text based that other route(s) are safer; Display alternative route(s) and recommend safest route |

Referring to Row 1 of Table B, where no alternate route is safer, an action decision can be returned to send a notification, e.g. a text based notification for display on a user interface of a client computer device, e.g. in notifications area 4030 of user interface 4000 (FIG. 4) specifying that the current route is the best route. Referring to Row 2 of Table B, where the result of performing predictions as to driver safety performance using the alternative routes returns the result that one or more alternative route is safer, the action decision specified in Row 2 can be returned resulting in a different notification for display in notifications area 4030 of user interface 4000. In accordance of the action decision of Row 2, a notification can be displayed indicating that other routes (e.g. with text highlighting) are safer as part of the notification there can be displayed specific text based descriptions of the alternative routes. The notification can further indicate the safest route as the recommended route. As set forth herein, manager system 110 can also present options as to drivers. All text based notifications described herein can be replaced or supplemented with synthesized voice based notifications.

In the example described in reference to Table B, manager system 110 can perform predictions as to driver safety for a single driver as to different alternate routes, wherein each prediction uses historical data and driving environment classification data associated to the driver user. By extension, it can be seen that manager system 110 can return similar predictions for alternate routes, but can apply them for multiple different candidate users, such as different candidate users provided by users who are currently passengers within the vehicle as may be determined using location data. Manager system 110 for determining a list of all users currently within a vehicle can examine in data repository 108 current location data for all users and can identify all users currently located at a location of the current vehicle. Manager system 110 according to one embodiment can return predicted driver safety performance data for all candidate users and all candidate routes. Accordingly, manager system 110 can return the list of predicted safety performance scores for all users and for all candidate routes and can present the list as a sorted list in descending order ranked according to predicted driver safety score. Based on the data of the described ordered list, manager system 110 can use the decision data structure of Table C to return an action decision.

TABLE C

| ROW | RESULT | ACTION DECISION |
|---|---|---|
| 1 | No candidate driver returned a higher score than current driver | Notification that the current driver is the safest driver and the current route is the safest |
| 2 | One or more candidate driver returned a predicted score higher than the current driver, or one or more alternate route returned a | Notification to present the ordered list with recommendations to change route and/or driver. |

TABLE C-continued

| ROW | RESULT | ACTION DECISION |
|---|---|---|
| | score higher than the current route. | |

Referring to Table C, an alternative notification can be sent to users, e.g. passenger users of a current vehicle in dependence on a result of performing of a plurality of predictions, wherein predicted safety performance of various candidate drivers are returned for various candidate routes.

With further reference to the flowcharts of FIGS. 3A and 3B, manager system 110 for performing action decision block 1114 can use a decision data structure, such as a decision data structure set forth in Tables A, B, or C, and in response to completion of block 1114 can proceed to block 1115 to provide one or more output to perform the action specified in the action decision in a manner set forth herein, e.g. in connection with blocks 1203, 1304, and 1404. With further reference to the flowcharts of FIGS. 3A and 3B, manager system 110 in response to completion of block 1124 can proceed to block 1125.

At block 1125, manager system 110 can perform machine learning training of predictive models used by manager system 110 in providing services. For example, referring to predictive model 5002 as set forth in FIG. 5, it will be seen that on completion of block 1123, when a trip has ended, additional time segment data is available, i.e. the time segments defining the recently completed trip and data of these time segments can be used as iterations of training data as set forth herein for training of predictive model 5002 so that predictive model 5002 learns a relationship between driving environment classification dataset for a time segment and an error event dataset for a time segment, i.e. the relationship between environmental conditions that are existing for a driver and the errors exhibited by the driver user when those environmental conditions are present.

Figure 6:
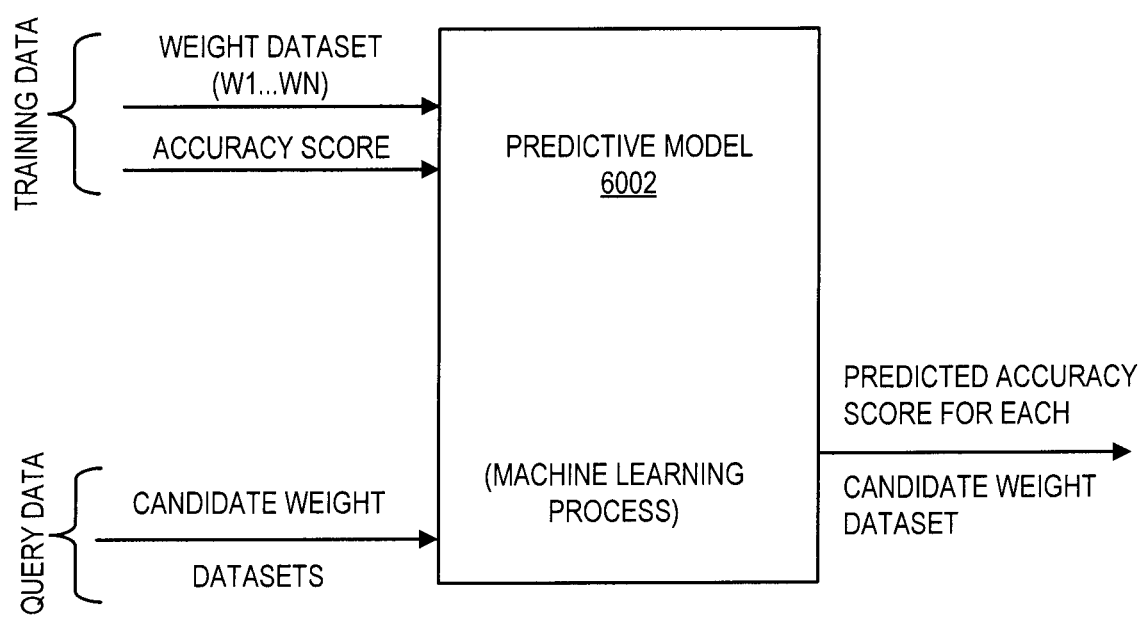
FIG. 6 depicts a predictive model that can be trained according to machine learning processes according to one embodiment.

Further in reference to predictive model 6002 as set forth in FIG. 6, predictive model 6002 at block 1125 can be trained by machine learning processes. Predictive model 6002 is a predictive model that predicts the accuracy of Eq. 1, as set forth herein, in predicting actual driver safety performance of a driver. Predictive model 6002 can be trained with use of machine learning training data, wherein each iteration of training data can include a weight dataset used for the predicting and an accuracy score associated to the predicting. At block 1125, subsequent to completion of a trip determined to be completed at block 1123, predictive model 6002 can be trained with a new iteration of training data. The new iteration of training data can be the set of weights $W_1$-$W_N$ used to return a prediction of the driver's performance on the recently completed trip before it commenced and the accuracy score can be a score indicating the accuracy of that prediction in comparison to the actual realized safety performance of that driver during the recently completed trip which has been determined at block 1124.

Machine learning training described in reference to predictive model 6002 describes reinforcement machine learning training, wherein predictive models can be trained with use of results data indicative of the performance of the model. Prior to the application of an iteration of training data described, predictive model 6002 will have been iteratively trained with prior iterations of training data with prior weight datasets associated with prior predictions and prior accuracy scores associated with those prior predictions. Predictive model 6002, once trained is able to respond to query data. The query data can include a set of candidate weight datasets, for example the variations of in the weighted values of the weights $W_1$-$W_N$. With further reference to FIG. 6, the resulting data resulting from the application of query data can be a predicted accuracy score for each candidate weight dataset. Based on the returned results from querying predictive model 6002, manager system 110 can select a weight dataset ($W_1 \ldots W_N$) for use in next iteration of an application of Eq. 1.

Various available tools, libraries, and/or services can be utilized for implementation of predictive model 5002 and predictive model 6002. For example, a machine learning service can provide access to libraries and executable code for support of machine learning functions. A machine learning service can provide access set of REST APIs that can be called from any programming language and that permit the integration of predictive analytics into any application. Enabled REST APIs can provide e.g. retrieval of metadata for a given predictive model, deployment of models and management of deployed models, online deployment, scoring, batch deployment, stream deployment, monitoring and retraining deployed models. Enabled REST APIs can provide e.g. retrieval of metadata for a given predictive model, deployment of models and management of deployed models, online deployment, scoring, batch deployment, stream deployment, monitoring and retraining deployed models. Training predictive model 5002 and/or predictive 6002 can include use of e.g. support vector machines (SVM), Bayesian networks, neural networks and/or other machine learning technologies.

Embodiments herein recognize that as more technologies are enabling concepts like ride-sharing and car-sharing, there is an increased risk in the reliability and safety of drivers. Common ride-sharing offerings enable everyday drivers to become the means of transportation for groups and individuals. However, significant responsibility is put on them, without any specific training. Embodiments herein create a profile for drivers, regardless of the vehicle they are driving (whether their own, or a borrowed car). System 100 can track the performance of the driver and create a digital 'track record' for the driver, that can be shared with others to help them make the decision on whether or not to trust the driver for a future trip given known routes, length, and other conditions.

System 100 can be set up to retrieve then analyze IoT sensor data related to a driver trip. System 100 initiates data capture when a driver enters the vehicle (this can be via login, facial recognition or any other known method of identifying a person). The IoT sourced data can include e.g. speed, GPS location, images of road including markings, gyroscope settings, and timestamp. This data will then be analyzed to create supplemental reportable information such as acceleration rate, hard breaking, distance/swerving from road markers, car tilt on any given road given environmental condition.

In addition to personal driver metrics, system 100 can link with external data sources related to the driver. For example, the profile can link with their auto insurance provider to obtain historic records regarding accidents. In another example, the system can feature lookup of public police records to find any instances where the driver may have been involved.

System 100 can provides an interface such as user interface 4000 (FIG. 4), which a user driver can use to display their profile and score to others who are deciding whether or not to ride with them for any given trip.

Cognitive analysis can be used to compare historic mix of conditions on trips with the new trip that is being considered.

Example 1

(A) Person user A needs a ride, tries to call a cab from a popular Mobile App. Enters destination location; (B) Mobile App. queries system 100 e.g. data repository 108 to scan driver profiles by safety rating, given the proposed route and destination; (C) System 100 identifies Driver A as the best driver for the route, given their driver profile; (D) Mobile App. pushes Driver A's driver profile to Person A; (E) Person user A can decide if they will take the ride, or wait for another driver.

End of Example 1

Example 2

A parent has told a teenage child that they cannot drive with inexperienced drivers. Based on the lack of data for a particular driver, system 100 reports that their child should not drive with the child's friend (for which there is insufficient data).

End of Example 2

Example 3

A team from work is on a business trip. They are going out together. Nobody really knows how the others drive. System 100 detects that one driver has a lower score in the evening. The team decides to choose any of the other as the designated driver.

End of Example 3

Example 4

A trucking company is looking to hire a driver for a big rig. The company checks with system 100 to see how a candidate driver drives on long hauls. In addition, when assigning work, the trucking company optimizes assignments around matching the route/conditions to the driver profiles.

End of Example 4

Example 5

An insurance company for a limousine company gives lower rates to companies that avoids higher risk drivers. System 100 is used to generate a report on driver user's safety performance for use in establishing an insurance premium.

End of Example 5

Example 6

A driver user A creates an account for the first time. The driver user enters a vehicle to start a new trip. The driver logs into their account using system 100. System 100 queries external data sources to identify historic accident records, or reports. While logged in, the vehicle tracks metrics and sends data to system 100. System 100 analyzes driver tendencies, speed/smoothness/length of drive, and similar statistics. System 100 calculates a dynamic driver rating for user A. User A and User B then want to take a trip to Location Z. User A queries system 100 to decide which of them should drive. System 100 analyzes a driver rating of both users, e.g. as provided by a predicted safety performance for both drivers considering the distance, terrain, and other factors on the way to Location Z. System 100 recommends user A to drive based on the analyzed historical data.

End of Example 6

There is set forth herein a system and method of compiling a sharable personalized driver report for different conditions and vehicles from IoT sensor devices. There is set forth herein a system and method of utilizing a personalized driver report for a future route to determine if the route/driver combination exceeds acceptable threshold for an individual.

System 100 can receive information from IOT sensors on a vehicle. Information can include e.g. driver, routes travelled, undesirable driving error flags (e.g. speeding, hard stop/start, near collisions) or any other configurable input from an individual. The sensors do not have to be tied to the car and can start prior to any trip. An individual's history can be captured and stored. This is then used as input for any future trips. Historical records can also include public records from police departments and insurance company. System 100 can generate a report card for an individual user. The report can be presented to show different dimensions (e.g. time of day, weather, previous activities such as recreating versus in school, type of road, length of drive). The report can be used independently as a report or used as input to determine risk for any given trip. When used as an input for a trip, system 100 providing one or more output in dependence on the report can send control data for controlling operation of a vehicle.

Proposed trips and drivers can be entered into system 100. System 100 calculate the risk for the different drivers given current conditions and considers all possible candidate routes to the desired location. System 100 can give a positive recommendation, negative recommendation, or set conditions on the trip (e.g. no highway driving) e.g. the conditions can be expressed with a text based notification and/or with control data that controls operation of a vehicle. In some embodiments, interested parties can be notified of lack of compliance with the recommendation.

Certain embodiments herein may offer various technical computing advantages involving computing advantages to address problems arising in the realm of computer systems and computer networks. Embodiments herein can use classification processes to auto-tag collected IoT sensor data with tags indicating an environment prevailing at the time of data acquisition. With use of classification and data tagging processes, intelligent action decision can be returned in various computing environments, including computing environments that employ location based services (LBS) and mobile computer environments such as a vehicle environment. Embodiments herein can include collecting and using data from a variety of data sources, including IoT sensor devices and other data sources such as a camera sensor of a traffic service system and a mobile client computer device of a driver user. Certain embodiments herein may offer various technical computing advantages involving computing advantages to address problems arising in the realm of computer networks and particularly computer networks operating to provide location based services (LBS). Various decision data structures can be used to drive artificial intelligence (AI) decision making, such as decision data structures that cognitively map predicted driving performance to action decisions which can include e.g. action decisions to disable or otherwise change performance of a vehicle, or action decision to prompt specified actions of users such as driver users and passenger users. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms. Embodiments herein can employ data structuring processes, e.g. processing for transforming unstructured data into a form optimized for computerized processing. Embodiments herein can examine data from diverse data sources such as vehicle disposed IOT sensors, client computer devices and various data services such as weather and traffic data services. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making. Certain embodiments may be implemented by use of a cloud platform/data center in various types including a software as a service (SAAS), platform as a service (PAAS), database as a service (DBAAS), and combinations thereof based on types of subscription the static optimization service may be provided for subscribed business entities and/or individuals in need for any location in the world.

Figure 7:
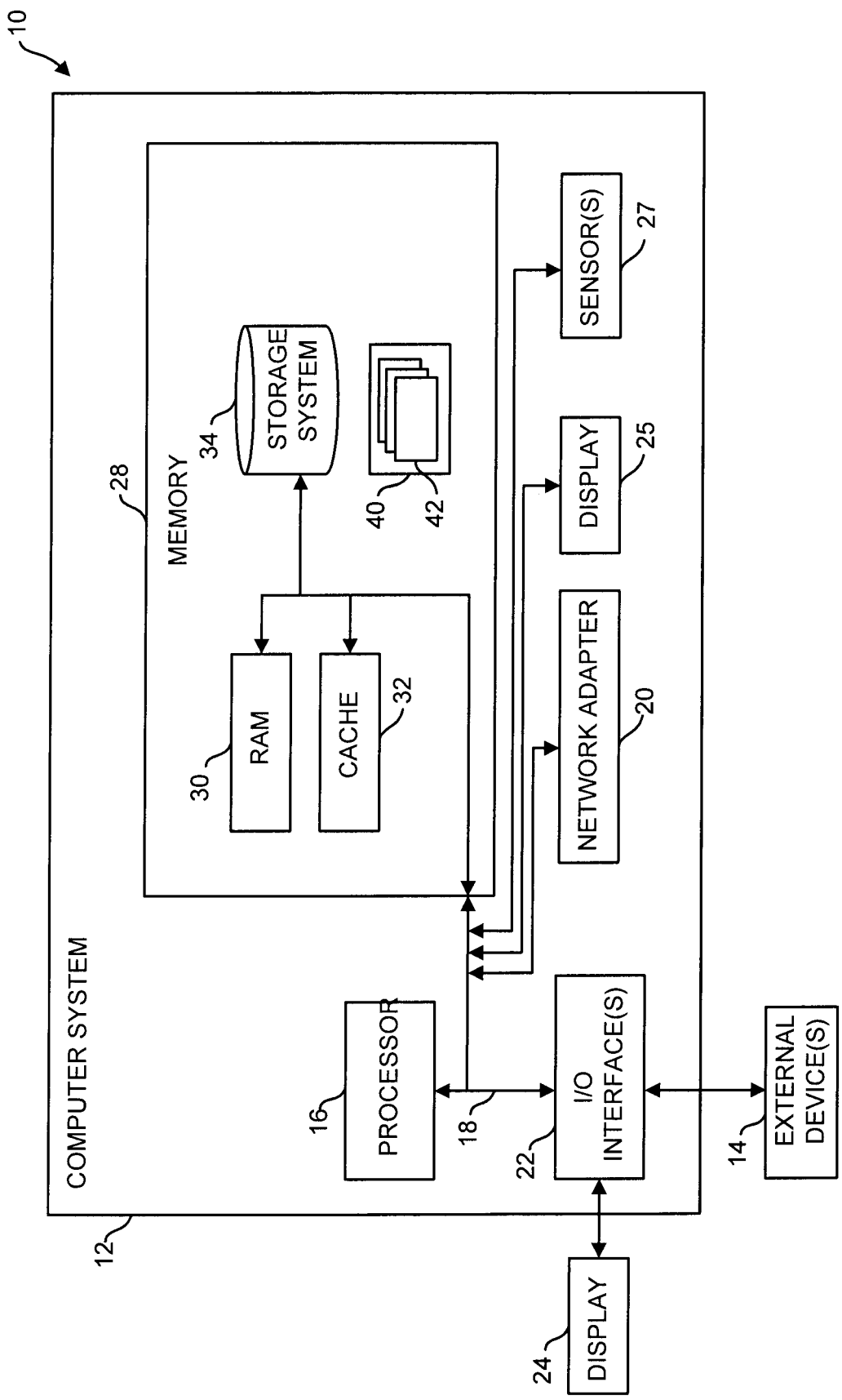
FIG. 7 depicts a computing node according to one embodiment.
Figure 8:
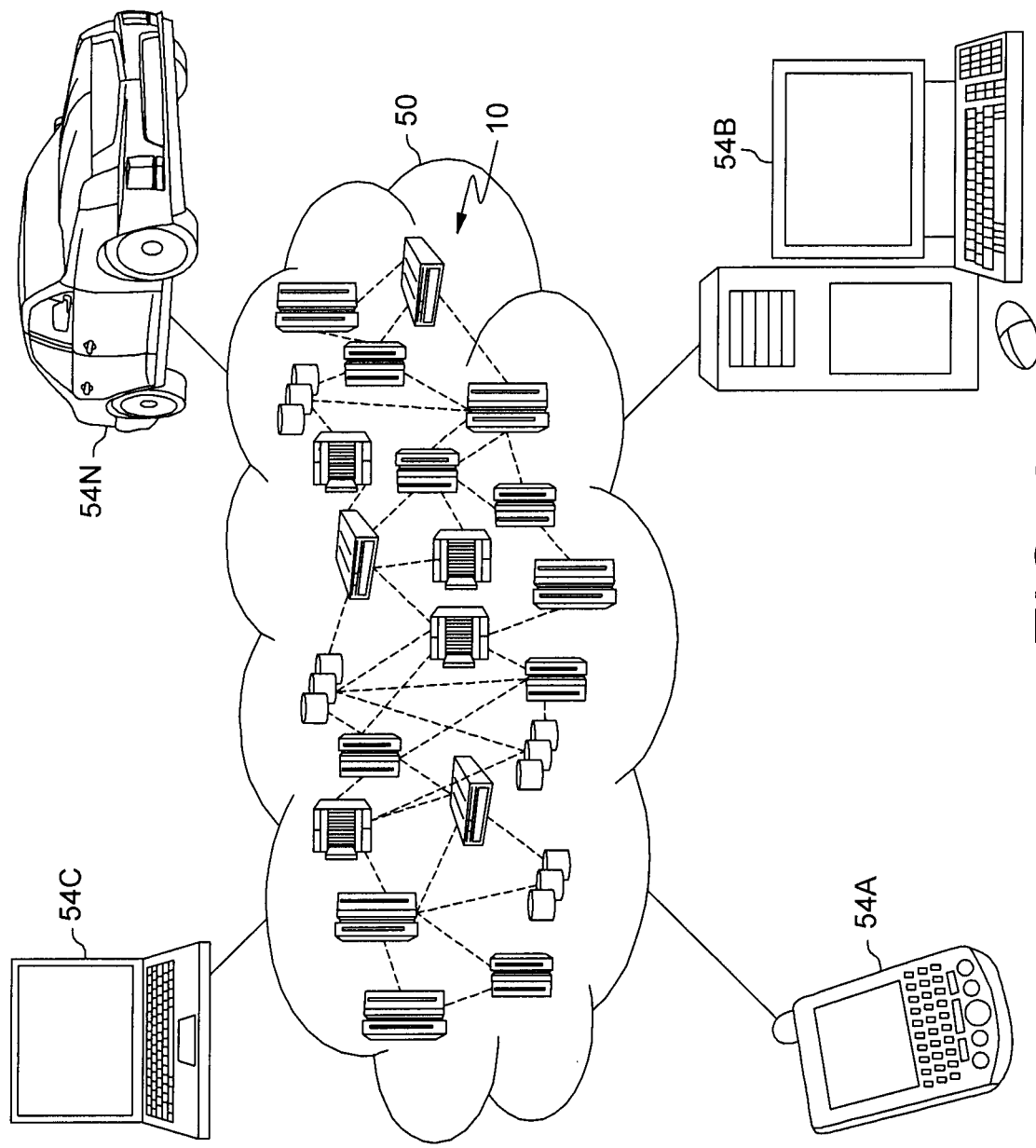
FIG. 8 depicts a cloud computing environment according to one embodiment.
Figure 9:
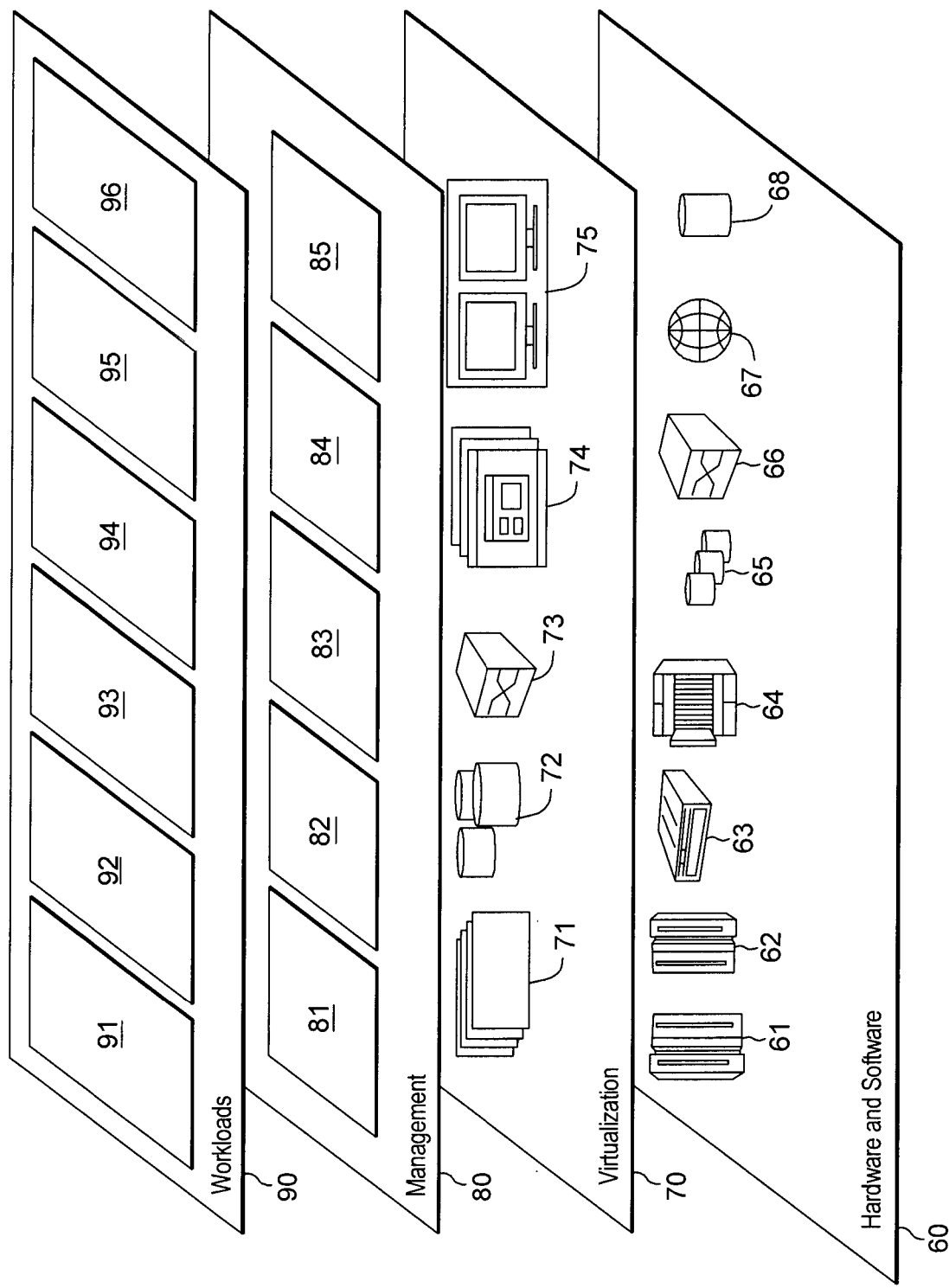
FIG. 9 depicts abstraction model layers according to one embodiment.

FIGS. 7-9 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 7, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 7, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 8-9.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with reference to manager system 110 as set forth in the flowchart of FIGS. 3A-3B. In one embodiment, vehicle systems 120A-120Z can include one or more computing node 10 and can include one or more program 40 for performing functions described with reference to vehicle systems 120A-120Z as set forth in the flowchart of FIGS. 3A-3B. In one embodiment, one or more client computer device 130A-130Z can include one or more computing node 10 and can include one or more program 40 for performing functions described with reference to one or more client computer device 130A-130Z as set forth in the flowchart of FIGS. 3A-3B. In one embodiment, enterprise systems 140A-140Z can include one or more computing node 10 and can include one or more program 40 for performing functions described with reference to enterprise systems 140A-140Z as set forth in the flowchart of FIGS. 3A-3B. In one embodiment, systems 150, 160, 170 can include one or more computing node 10 and can include one or more program 40 for performing functions described with reference to systems 150, 160, 170 as set forth in the flowchart of FIGS. 3A-3B. In one embodiment, the computing node based systems and devices depicted in FIG. 1 and FIG. 2 can include one or more program for performing functions described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20.

As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 8 computing node 10 is described as being implemented in a cloud computing environment and accordingly is referred to as a cloud computing node in the context of FIG. 8.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for logging historical driver performance indicating data are returning action decisions therefrom. The processing components 96 can be implemented with use of one or more program 40 described in FIG. 7.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

The invention claimed is:

1. A computer implemented method comprising:
obtaining sensor data from sensors disposed to output data indicative of vehicle driver performance of a first vehicle, the first vehicle having for a first trip an associated first driver user who drives the first vehicle during the first trip;
processing the sensor data to return error event flags that indicate errors of the first driver user when driving the first vehicle during the first trip;
recording for respective event flags of the error event flags values of a first driving environment classification parameter and values of a second driving environment classification parameter;
predicting a driving performance of the first driver user for a second trip, the second trip being a proposed trip to occur after the first trip, the predicting being in dependence on the error event flags, the values of a first driving environment classification parameter and the values of a second driving environment classification parameter, wherein the error event flags, the values of a first driving environment classification parameter and the values of a second driving environment classification parameter define historical driving performance data of the first driver user, wherein the second trip is a proposed for performance by a motor vehicle being driven by the first driver user, wherein the method includes obtaining candidate alternate routes for the second trip, and predicting safety performance of the first driver user for alternate routes of the candidate alternate routes; and
returning an action decision in dependence on the predicting, wherein the action decision is an action decision to recommend one or more of the alternate routes based on predicted safety performance of the first driver user as determined by the predicting safety performance.

2. The computer implemented method of claim 1, wherein the second trip is proposed for performance by a motor vehicle being driven by the first driver user, wherein the predicting indicates that the first driver user is not qualified to drive the motor vehicle according one or more criterion and wherein the action decision includes an action decision to disable the motor vehicle so that the motor vehicle cannot be driven by the first driver user.

3. The computer implemented method of claim 1, wherein the second trip is proposed for performance by a motor vehicle being driven by the first driver user, wherein the action decision includes an action decision to limit performance of the motor vehicle so that performance of the motor vehicle is modified when driven by the first driver user.

4. The computer implemented method of claim 1, wherein performing the predicting includes using a predictive model that has been trained by machine learning processes including application of iteratively applied sets of training data, wherein respective applied sets of training data for respective iterations of the iteratively applied set of training data include (a) an environment condition values dataset specifying environmental conditions for the first vehicle for a time segment of the first trip; and (b) an error event flag dataset specifying error events of the first driver user during the time segment of the first trip.

5. The computer implemented method of claim 1, wherein the second trip is proposed for performance by a motor vehicle being driven by the first driver user, wherein the method includes detecting a presence of one or more passenger within the motor vehicle, further predicting the performance of the one or more passenger in driving the motor vehicle during the proposed trip, and wherein the returned action decision specifies sending a text based notification to the first driver user and the one or more passenger specifying a predicted performance of the one or more passenger in driving the motor vehicle during the proposed trip.

6. The computer implemented method of claim 1, wherein the second trip is proposed for performance by a motor vehicle being driven by the first driver user, wherein the method includes detecting a presence of one or more passenger within the motor vehicle, further predicting the performance of the one or more passenger in driving the motor vehicle during the proposed trip, and wherein the returned action decision specifies sending a text based notification to the first driver user and the one or more passenger specifying a predicted performance of the one or more passenger in driving the motor vehicle during the proposed trip, wherein the motor vehicle is provided by one of the following selected from the group consisting of: (a) the first vehicle, and (b) a second vehicle different from the first vehicle.

7. The computer implemented method of claim 1, wherein the method includes tagging the event flags of the error event flags with values of the first driving environment classification parameter and with values of the second driving environment classification parameter.

8. The computer implemented method of claim 1, wherein the second trip is proposed for performance by a motor vehicle being driven by the first driver user, wherein the predicting includes using a known vehicle type of the motor vehicle, forecasted roadway types of the second trip, forecasted times of day of the second trip, forecasted weather conditions for the second trip, and a forecasted duration of the second trip, wherein the predicting further includes using (i) historical driving performance data of the first driver user when driving vehicles of the type of the known vehicle type, (ii) historical driving performance data of the first driver user when driving roadways of the forecasted roadway types, (iii) historical driving performance data of the first driver user when driving during the forecasted times of day, (iv) historical driving performance data of the first driver user when driving forecasted weather condition; and (v) historical driving performance data of the first driver user when driving on past trips of the forecasted duration.

9. The computer implemented method of claim 1, wherein the second trip is proposed for performance by a motor vehicle being driven by the first driver user, wherein the method includes detecting a presence of one or more passenger within the motor vehicle, further predicting the performance of the one or more passenger in driving the motor vehicle during the proposed trip, and wherein the action decision includes an action decision to prompt a switch a current driver of the motor vehicle for the second trip to a next driver provided by the one or more passenger.

10. The computer implemented method of claim 1, wherein the second trip is proposed for performance by a motor vehicle being driven by the first driver user, wherein the method includes detecting a presence of one or more passenger within the motor vehicle, and wherein the action decision includes an action decision to send a notification to the one or more passenger within the motor vehicle specifying a predicted performance of the first driver user for the second trip.

11. The computer implemented method of claim 1, wherein the second trip is a proposed for performance by a motor vehicle being driven by the first driver user, wherein the method includes identifying a plurality of passengers located in the motor vehicle and wherein the method includes obtaining candidate alternate routes for the second trip, and predicting safety performance of the first driver user and the plurality of passengers for alternate routes of the candidate alternate routes, wherein the action decision includes an action decision to recommend one or more of the alternate routes and one or more alternate current driver for the motor vehicle based on predicted safety performance of the first driver user and the plurality of passengers as determined by the predicting safety performance.

12. The computer implemented method of claim 1, wherein sensors disposed to output data indicative of vehicle driver performance of a first vehicle include (a) an engine sensor disposed in the first vehicle, (b) a brake sensor disposed in the first vehicle, (c) a GPS sensor disposed in the first sensor, (d) a first camera sensor disposed in the first vehicle, (e) a second camera sensor disposed at a traffic intersection for capture of image data representing the first vehicle and (f) a touch pad sensor disposed in a mobile client computer device of the first driver user, wherein the method includes processing image data output by the first camera sensor to identify errors of the first driver user characterized by the first driver user not looking at a roadway ahead, wherein the method includes processing image data output by the second camera sensor to identify traffic infractions of the first driver user occurring at the traffic intersection, and the method includes processing data of the touch pad sensor to identify errors of the first driver user characterized by the first driver user texting while driving.

13. The computer implemented method of claim 1, wherein the first driving environment classification parameter is a time of day driving environment parameter and wherein the second driving environment classification parameter is a weather classification parameter.

14. The computer implemented method of claim 1, wherein method includes recording for respective event flags of the error event flags values of a values of a third driving environment classification parameter, values of a fourth driving environment classification parameter, values of a fifth driving environment classification parameter, and values of a sixth driving environment classification parameter, wherein the first driving environment classification parameter is a vehicle type classification parameter such that parameter values thereof specify a vehicle type of the first vehicle, wherein the second driving environment classification parameter is a last activity classification parameter such that parameter values thereof specify a most recent activity of the first driver user prior to the first trip, wherein the third driving environment classification parameter is a last activity classification parameter such that parameter values thereof specify whether a current roadway is a highway, or a city roadway, wherein the fourth driving environment classification parameter is a time of day driving environment classification parameter such that parameter values thereof specify whether a current time of day is day or night, wherein the fifth driving environment classification parameter is a weather driving environment classification parameter such that parameter values thereof specify whether a current weather being experienced by the first vehicle is rainy, snowing, or clear, and wherein the sixth driving environment classification parameter is a length driving environment classification parameter such that parameter values thereof are in dependence on a current elapsed time from commencement of the first trip.

15. The computer implemented method of claim 1, wherein the returning an action decision is in dependence on configuration data defined by a user, wherein the configuration data specifies one or more criterion that qualifies the first driver user for acting as a driver in the second trip.

16. The computer implemented method of claim 1, wherein the returning an action decision is in dependence on configuration data defined by an administrator user based on data entered into a user interface by the administrator user, wherein the configuration data specifies a plurality of criterion for qualifying the first driver user as a driver in the second trip, wherein the plurality of criterion include each of the following criterion: (a) that a predicted performance of the first driver user when driving a first type of vehicle specified by the administrator user exceeds a performance threshold specified by the administrator user; (b) that a predicted performance of the first driver user when driving on a roadway type specified by the administrator user exceeds a performance threshold specified by the administrator user; (c) that a predicted performance of the first driver user when driving during a time of day specified by the administrator user exceeds a performance threshold specified by the administrator user; (d) that a predicted performance of the first driver user when driving under weather conditions specified by the administrator user exceeds a performance threshold specified by the administrator user.

17. The computer implemented method of claim 1, wherein the method includes tagging the event flags of the error event flags with values of the first driving environment classification parameter and with values of the second driving environment classification parameter, wherein the first driving environment classification parameter is a time of day driving environment parameter and wherein the second driving environment classification parameter is a weather classification parameter, wherein performing the predicting includes using a predictive model that has been trained by machine learning processes including application of iteratively applied sets of training data, wherein the second trip is a proposed for performance by a motor vehicle being driven by the first driver user, wherein the method includes identifying a plurality of passengers located in the motor vehicle and wherein the method includes obtaining candidate alternate routes for the second trip, and predicting safety performance of the first driver user and the plurality of passengers for alternate routes of the candidate alternate routes, wherein the action decision is an action decision to recommend one or more of the alternate routes and one or more alternate current driver for the motor vehicle based on predicted safety performance of the first driver user and the plurality of passengers as determined by the predicting safety performance.

18. A computer program product comprising:
   a computer readable storage medium readable by one or more processing circuit and storing instructions for execution by one or more processor for performing a method comprising:
   obtaining sensor data from sensors disposed to output data indicative of vehicle driver performance of a first vehicle, the first vehicle having for a first trip an associated first driver user who drives the first vehicle during the first trip;

processing the sensor data to return error event flags that indicate errors of the first driver user when driving the first vehicle during the first trip;

recording for respective event flags of the error event flags values of a first driving environment classification parameter and values of a second driving environment classification parameter;

predicting a driving performance of the first driver user for a second trip, the second trip being a proposed trip to occur after the first trip, the predicting being in dependence on the error event flags, the values of a first driving environment classification parameter and the values of a second driving environment classification parameter, wherein the error event flags, the values of a first driving environment classification parameter and the values of a second driving environment classification parameter define historical driving performance data of the first driver user, wherein the second trip is proposed for performance by a motor vehicle being driven by the first driver user; and returning an action decision in dependence on the predicting, wherein the action decision includes an action decision to limit performance of the motor vehicle so that performance of the motor vehicle is modified when driven by the first driver user.

19. The computer program product of claim 18, wherein the second trip is a proposed for performance by a motor vehicle being driven by the first driver user, wherein the method includes obtaining candidate alternate routes for the second trip, and predicting safety performance of the first driver user for alternate routes of the candidate alternate routes, wherein the action decision includes an action decision to recommend one or more of the alternate routes based on predicted safety performance of the first driver user as determined by the predicting safety performance.

20. A system comprising:
a memory;
at least one processor in communication with memory; and
program instructions executable by one or more processor via the memory to perform a method comprising:
obtaining sensor data from sensors disposed to output data indicative of vehicle driver performance of a first vehicle, the first vehicle having for a first trip an associated first driver user who drives the first vehicle during the first trip;

processing the sensor data to return error event flags that indicate errors of the first driver user when driving the first vehicle during the first trip;

recording for respective event flags of the error event flags values of a first driving environment classification parameter and values of a second driving environment classification parameter;

predicting a driving performance of the first driver user for a second trip, the second trip being a proposed trip to occur after the first trip, the predicting being in dependence on the error event flags, the values of a first driving environment classification parameter and the values of a second driving environment classification parameter, wherein the error event flags, the values of a first driving environment classification parameter and the values of a second driving environment classification parameter define historical driving performance data of the first driver user, wherein performing the predicting includes using a predictive model that has been trained by machine learning processes including application of iteratively applied sets of training data, wherein respective applied sets of training data for respective iteration of the iteratively applied set of training data include (a) an environment condition values dataset specifying environmental conditions for the first vehicle for a time segment of the first trip; and (b) an error event flag dataset specifying error events of the first driver user during the time segment of the first trip; and returning an action decision in dependence on the predicting.

* * * * *